US008175463B2

(12) United States Patent
Elberbaum

(10) Patent No.: US 8,175,463 B2
(45) Date of Patent: May 8, 2012

(54) METHOD AND APPARATUS FOR CONNECTING AC POWERED SWITCHES, CURRENT SENSORS AND CONTROL DEVICES VIA TWO WAY IR, FIBER OPTIC AND LIGHT GUIDE CABLES

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 336 days.

(21) Appl. No.: 12/236,656

(22) Filed: Sep. 24, 2008

(65) Prior Publication Data

US 2010/0278537 A1 Nov. 4, 2010

(51) Int. Cl.
*H04B 10/00* (2006.01)

(52) U.S. Cl. .................... 398/141; 398/110; 398/167.5; 398/113

(58) Field of Classification Search .................... 398/58, 398/106–111, 113, 135, 140–141
See application file for complete search history.

(56) References Cited

U.S. PATENT DOCUMENTS 4,324,981 A * 4/1982 Miller .......................... 250/551
4,422,180 A * 12/1983 Wendt .......................... 398/110
4,495,421 A * 1/1985 Endo et al. .................... 250/551
4,704,656 A * 11/1987 Neiger .......................... 361/173
4,889,999 A * 12/1989 Rowen ............................ 307/31
5,033,112 A * 7/1991 Bowling et al. ............... 398/110
5,068,890 A * 11/1991 Nilssen ...................... 379/90.01
5,117,122 A * 5/1992 Hogarth et al. ............... 307/140
5,162,968 A * 11/1992 Neiger .......................... 361/173
5,163,112 A * 11/1992 Lefevre et al. ................. 385/19
5,323,256 A * 6/1994 Banks ........................... 398/111
5,352,957 A * 10/1994 Werner ......................... 315/291
5,404,080 A * 4/1995 Quazi ........................... 315/151
5,455,488 A * 10/1995 Rhoades et al. .............. 315/156
5,471,190 A * 11/1995 Zimmermann ................ 340/9.1
5,552,921 A * 9/1996 Hetzel et al. .................. 398/154
5,602,668 A * 2/1997 Kuchta .......................... 398/172
5,815,086 A * 9/1998 Ivie et al. ................... 340/12.52
5,838,116 A * 11/1998 Katyl et al. ................... 315/307
5,905,442 A * 5/1999 Mosebrook et al. ........... 340/3.7
5,923,363 A 7/1999 Elberbaum
5,942,814 A * 8/1999 Sutterlin et al. .............. 307/125
5,967,840 A * 10/1999 Rose et al. .................... 439/577
(Continued)

FOREIGN PATENT DOCUMENTS

KR 1020040068433 7/2004
(Continued)

OTHER PUBLICATIONS

U.S. Appl. No. 11/874,309, filed Oct. 18, 2007.

(Continued)

*Primary Examiner* — Agustin Bello
(74) *Attorney, Agent, or Firm* — Katten Muchin Rosenman LLP

(57) ABSTRACT

A method for connecting an AC powered device, which has an optical receiver, with a control circuit, which has an optical transmitter, using at least on optical medium cable includes the steps of terminating the cable at both of its ends, introducing the processed cable between the receiver and transmitter, attaching and securing one end of the processed cable to the transmitter and the other end of the processed cable to the receiver, and propagating a one way optical signal including control commands from the control circuit to the powered device.

50 Claims, 11 Drawing Sheets

U.S. PATENT DOCUMENTS

| | | | | | |
|---|---|---|---|---|---|
| 5,982,051 | A * | 11/1999 | Cousy | 307/115 |
| 5,987,205 | A * | 11/1999 | Moseley et al. | 385/125 |
| 6,108,331 | A * | 8/2000 | Thompson | 370/352 |
| 6,181,086 | B1 * | 1/2001 | Katyl et al. | 315/307 |
| 6,222,853 | B1 * | 4/2001 | Marttinen et al. | 370/465 |
| 6,297,724 | B1 * | 10/2001 | Bryans et al. | 340/3.51 |
| 6,380,696 | B1 * | 4/2002 | Sembhi et al. | 315/294 |
| 6,380,852 | B1 * | 4/2002 | Hartman et al. | 340/521 |
| 6,388,399 | B1 * | 5/2002 | Eckel et al. | 315/312 |
| 6,420,964 | B1 * | 7/2002 | Nishikawa et al. | 375/257 |
| 6,507,273 | B1 * | 1/2003 | Chang et al. | 340/3.1 |
| 6,528,957 | B1 * | 3/2003 | Luchaco | 315/307 |
| 6,543,940 | B2 * | 4/2003 | Chu | 385/53 |
| 6,545,434 | B2 * | 4/2003 | Sembhi et al. | 315/312 |
| 6,548,967 | B1 * | 4/2003 | Dowling et al. | 315/318 |
| 6,603,842 | B2 | 8/2003 | Elberbaum | |
| 6,666,400 | B2 * | 12/2003 | White, III | 244/1 R |
| 6,697,757 | B2 * | 2/2004 | Eckel et al. | 702/130 |
| 6,731,079 | B2 * | 5/2004 | Andersen | 315/312 |
| 6,798,341 | B1 * | 9/2004 | Eckel et al. | 340/521 |
| 6,855,881 | B2 * | 2/2005 | Khoshnood | 174/15.1 |
| 6,891,284 | B2 * | 5/2005 | Tilley | 307/116 |
| 6,940,957 | B2 | 9/2005 | Elberbaum | |
| 7,015,458 | B2 * | 3/2006 | Endicott | 250/227.21 |
| 7,042,339 | B2 * | 5/2006 | Bruccoleri et al. | 340/12.34 |
| 7,151,968 | B2 * | 12/2006 | Williamson | 700/65 |
| 7,233,115 | B2 * | 6/2007 | Lys | 315/291 |
| 7,290,702 | B2 | 11/2007 | Elberbaum | |
| 7,430,591 | B2 * | 9/2008 | Chamberlain | 709/220 |
| 7,612,653 | B2 * | 11/2009 | Miller et al. | 340/286.02 |
| 7,639,907 | B2 | 12/2009 | Elberbaum | |
| 7,649,727 | B2 | 1/2010 | Elberbaum | |
| 7,755,506 | B1 * | 7/2010 | Clegg et al. | 340/12.3 |
| 7,761,555 | B1 * | 7/2010 | Bishel | 709/224 |
| 7,764,190 | B2 * | 7/2010 | Mortensen | 340/12.52 |
| 7,772,724 | B2 * | 8/2010 | Mosebrook et al. | 307/139 |
| 7,802,927 | B2 * | 9/2010 | Benjamin et al. | 385/88 |
| 7,864,500 | B2 | 1/2011 | Elberbaum | |
| 7,924,174 | B1 * | 4/2011 | Gananathan | 340/999 |
| 7,959,362 | B2 * | 6/2011 | Sommer | 385/75 |
| 7,994,436 | B2 * | 8/2011 | Yamamoto et al. | 174/520 |
| 8,041,221 | B2 * | 10/2011 | Elberbaum | 398/111 |
| 2002/0060530 | A1 * | 5/2002 | Sembhi et al. | 315/291 |
| 2002/0146207 | A1 * | 10/2002 | Chu | 385/53 |
| 2002/0175641 | A1 * | 11/2002 | Andersen | 315/312 |
| 2004/0000816 | A1 * | 1/2004 | Khoshnood | 307/149 |
| 2004/0141744 | A1 * | 7/2004 | Krill et al. | 398/58 |
| 2004/0212321 | A1 * | 10/2004 | Lys et al. | 315/291 |
| 2004/0217718 | A1 * | 11/2004 | Kumar et al. | 315/291 |
| 2005/0018648 | A1 * | 1/2005 | Scheelke | 370/351 |
| 2005/0040247 | A1 * | 2/2005 | Pouchak | 236/44 C |
| 2005/0162273 | A1 * | 7/2005 | Yoon et al. | 340/539.14 |
| 2005/0218838 | A1 * | 10/2005 | Lys | 315/291 |
| 2005/0273820 | A1 | 12/2005 | Elberbaum | |
| 2007/0171091 | A1 | 7/2007 | Nisenboim et al. | |
| 2007/0206949 | A1 * | 9/2007 | Mortensen | 398/113 |
| 2008/0068207 | A1 | 3/2008 | Elberbaum | |
| 2008/0180040 | A1 * | 7/2008 | Prendergast et al. | 315/297 |
| 2008/0265799 | A1 * | 10/2008 | Sibert | 315/292 |
| 2009/0021955 | A1 * | 1/2009 | Kuang et al. | 362/479 |
| 2009/0284184 | A1 * | 11/2009 | Valois et al. | 315/312 |
| 2010/0052863 | A1 * | 3/2010 | Renfro et al. | 340/10.4 |
| 2010/0084992 | A1 * | 4/2010 | Valois et al. | 315/291 |
| 2010/0194304 | A1 * | 8/2010 | Mosebrook et al. | 315/246 |
| 2010/0278537 | A1 * | 11/2010 | Elberbaum | 398/112 |
| 2011/0110673 | A1 * | 5/2011 | Elberbaum | 398/202 |

FOREIGN PATENT DOCUMENTS

| | | |
|---|---|---|
| KR | 1020050081505 | 8/2005 |
| WO | 2005/125189 | 12/2005 |

OTHER PUBLICATIONS

U.S. Appl. No. 11/939,785, filed Nov. 14, 2007.

* cited by examiner 252S
252
257
Terminals
252G
12A or 13A 252S
252
258
13A
252B
255
12A 252S
252
259
252B-TX
252B-RX
12A
13A 256
252
257L
256
12A or 13A 252
258L
13A
252G
256
255
12A 252
259L
256
12A
13A 60M
AC
252H
252
252CL
252J
10P-1
10P-n
65
10-1
10-n
#1
#2
#3
#4
#5
#6
TWO WAY
TX-33A
RX-32A
13A
12A
255
251
62
63
CODES MEMORY
SYSTEM MEMORY
CPU & DRIVERS PROCESSOR
61
TWO WAY DATA PROCESSOR
80
81
82
WIRED DATA DRIVER & POWER
69P
WIRED DATA DRIVER
69
VIDEO IN
67
POWER SUPPLY
68
68 - 11
USB DRIVER
64
66
INTERNET
259P
258P
259
258
10P - 1
10P - n
10 - 1
10 - n
DC

METHOD AND APPARATUS FOR CONNECTING AC POWERED SWITCHES, CURRENT SENSORS AND CONTROL DEVICES VIA TWO WAY IR, FIBER OPTIC AND LIGHT GUIDE CABLES

BACKGROUND OF THE INVENTION

1. Field of the Invention

This invention is related to home automation control including video interphone system for remotely operating AC power switches and electrical devices and appliances via two way IR remote control, fiber optic and light guide cables.

2. Description of the Prior Art

Wired or wireless remote control devices including Infra-Red (IR) or RF transmitter for remotely operating AC powered electrical appliances such as television receivers, home heaters, air conditioners, motorized curtains, lighting and other electrical appliances in homes, apartments, offices and buildings in general do switch the appliances on-off, with the person operating the remote control device verifying the on or off status of the operated device by visual means, such as the TV is on, or the lights are off, or the aircondition unit is activated or not, by being at the site of the operated appliance. Most of the remote control devices, including IR or wireless remote control devices use the same power key to switch the appliance on and off, therefore without the operating person's self verification on site, with most of currently available remote control devices it is impossible to positively verify the on-off power status without being at the appliance site.

On the other hand home automation relay devices, operated via two way communication signals can update the system controller with the relay's status by a returned status signal. The problem such system represents is the cost for customizing of the AC electrical wiring, which are expensive and require expertise to configure, install and setup. One reason is that the wiring systems that are used for the light's (or other appliances) on-off switches do not require and do not include the neutral wire of the AC mains.

The commonly wired electrical systems provide only two wires for the switches, the AC live or hot wire and the load wire that leads to the light fixture or other appliance. Similar two only traveler wires are used for connecting several switches that are tied up to switch on-off the same light or appliance. The "two only AC wires" with no neutral wire at the switch's electrical box call for changes to the commonly used electrical wiring and thus prevent simple introduction of home automation, Further, AC power devices that are directly connected to live AC power lines within the buildings must be tested to comply with electrical safety laws, rules and regulation and obtain approval and certification by organizations such as the UL in the USA, VDE or TUV in Europe, BS in the UK and similar organizations in other countries. Moreover, many of the known AC wiring regulations forbid the connecting of the AC wires and low voltage wired control systems inside the same electrical box and/or the connections of AC power wires and low voltage control wires to the same relay, remote switch and/or electrical power devices such as light dimmers. For this reason the remote control circuits of such power switching devices must be structured inside the switch and powered by the AC power.

The significance with remote controlling of home automation systems is the ability to switch electrical appliances on and off remotely via PCs through the Internet, via mobile telephones and/or via other PDA devices. The problem however for such remote controlling is the need for a verified on-off status of the appliances being operated and/or the availability of a status report covering all the remotely controlled appliances of a given house, office, apartment or a building.

Such devices for detecting the on-off status or a standby status is disclosed in U.S. patent application Ser. No. 11/874,309 dated Oct. 18, 2007, and IR devices for communicating such on-off or standby statuses via an IR remote control system along with IR remote control devices for operating AC power switches and AC operated appliances are disclosed in U.S. patent application Ser. No. 11/939,785 dated Nov. 14, 2007, with the content of both application Ser. Nos. 11/874,309 and 11/939,785, are incorporated herein by reference.

Similarly, such method and apparatuses for integrating remote control devices with video interphone systems and shopping terminals are also disclosed in U.S. application Ser. No. 11/024,233 dated Dec. 28, 2004 and U.S. application Ser. No. 11/509,315 dated Aug. 24, 2006.

For all the disclosed and known power switching and control devices, there is a need to access the devices for feeding control signals and retrieving switching status signal. But because of the electrical safety regulations in many countries including the US, it is forbidden to connect a low voltage communication line to an AC power switch or a dimmer inside the same electrical box.

The wireless and IR remote control devices can be used for the two way communications, however for the IR remote control a line of sight is necessary, and in the case of wireless, the signal may not reach devices in other rooms within the residence. This presents an uncertainty in commanding the switching on-off and the verifying of the appliance status and a solid verifiable communication via inter-connections between a low voltage powered control device and an AC power switch or a dimmer is needed.

SUMMARY OF THE INVENTION

It is an object of the present invention to provide a method and apparatus for inter-connecting AC power relays, light dimmers and other AC power devices including an AC current on-off sensing devices disclosed in the U.S. patent application Ser. Nos. 11/874,309 and 11/939,785 via fiber light guide or fiber optic cable with a wired low voltage IR control device that is installed separately in a designated electrical box.

Another object of the present invention is to operate and monitor the status of the electrical appliances through video interphones and/or "shopping terminals" and/or via a communication network including the generating of the control codes and signals from the video interphones and shopping terminals to the different appliances through a driver circuits as described in the above referenced application Ser. Nos. 11/024,233 and 11/509,315. "Shopping terminals" are disclosed in U.S. application Ser. No. 10/864,311 dated Jun. 8, 2004 and PCT international application PCT/US05/19564 dated Jun. 3, 2005 for method and apparatus for simplified e-commerce shopping via home shopping terminals. Video interphones systems are disclosed in U.S. Pat. Nos. 5,923,363, 6,603,842 and 6,940,957.

In the following description the term live AC refers to the "hot line" of the AC power or mains, as oppose to the neutral line of the AC power or mains. The term load refers to an appliance such as light fixture that is connected between the neutral line and the live AC line via an on-off switch or a dimmer.

In the following description the term transmitter refers to an LED, laser or other optical emitting devices that transform electric signals into IR or visual light signals.

The term transmitting refers to IR or visual light emission from a transmitter, in air such as from hand held remote control or into fiber optic or light guide cables.

The term receiver refers to photo diode, Pin diode, photo transistor or other photo detectors for receiving IR or visual light signals and converting them into electrical signals.

The term receiving refers to the receiving of IR or visual light, in air in line of sight, such as from an hand held IR remote control, or via fiber optic or light guide cables.

The term transceiver refers to a combined transmitter and receiver attached to an optical prism for propagating two way optical signals through a single optical medium cable by deflecting a received optical signal to the receiver and allowing the transmitted optical signal to pass into the optical medium cable, or to a combined transmitter and receiver for propagating two way optical signals via two optical medium cables.

The term optical signal refers to electromagnetic radiated signals within the visual spectrum and the IR spectrum.

The term IR AC switching device or AC devices or AC powered devices refer to a remote controlled AC power devices for switching on-off AC appliances, including mechanical contacts relays, semiconductor relays, triac relays, triacs for light dimming and for controlling motors, current sensors and AC outlets and combinations thereof, characterized by being powered through an AC power or in series with the controlled live AC line and remotely operated by IR or visual light signals.

Even though only IR or only visual light may be recited in the following descriptions, such as IR AC devices, the IR and the visual light term may refer to both. The term IR or visual light is used alternately and should not be restrictive to the one or the other.

The term low voltage IR or visual light control device refers to a control device powered by low DC or AC voltage such as 12V DC or 24V AC, for controlling the IR or visual light AC switching devices, including one or two way IR communication circuits and attachment facilities for attaching and securing light guide or fiber optic cables for connection with the AC switching device.

The term IR or visual light AC current sensor refers to a low voltage IR control device or AC powered current sensor circuit for detecting by induction the AC current drained through AC power wire, such as disclosed in above referred to U.S. patent application Ser. Nos. 11/874,309 and 11/939,785 and for generating current drain status via one way or two way IR or visual light communication circuits, including attachment facilities for attaching and securing light guide or fiber optic cables for connection with the AC switching devices.

The term pending US applications refers to the U.S. patent application Ser. Nos. 11/874,309 and 11/939,785 applied on Oct. 18, 2007 and Nov. 14, 2007 respectively.

The apparatus for remotely operating AC powered appliances and other objects of the present invention are attained by connecting a light guide or fiber optic cable between the IR AC switching device and a wired low voltage IR control device for communicating one or two way IR signals including commands to operate the electrical appliances and the IR AC switching device, and command confirmation including the AC current statuses of the connected electrical appliances, thereby generating on-off status signals from the appliances, in response to the received operational command or in response to an inquiry command (a request for status data) on the basis of the current sensor output, thereby providing error free remote controlling of the electrical home appliances.

The solution offered by the present invention, similar to the pending US application, is to install an add on IR or visual light operated AC devices that include relays, triacs and current sensors, packaged or encapsulated with wireless receiver and transmitter into a standard size casing of an AC switch or outlet, powered through the live AC line, and using such packaged device to augment any type of standard on-off switch for electrical appliances or lighting and not by replacing the whole existing electrical switches and wiring.

The IR receiver and transmitter of the add on IR AC devices are provided with attachment facilities for connecting light guide or fiber optic cable for propagating the one or two way IR communication signals between the IR AC switching device, the IR AC current sensor and a low voltage IR propagating devices, including a modified version of the IR repeater disclosed in the pending US applications, such that the IR repeater is also provided with a reciprocal light guide or fiber optic cable attachment. Because, the light guide and/or the fiber optic cable are an insulator, they can be attached to the IR AC switching device or the IR AC current sensor inside the same electrical box. By this arrangement it is possible to power the control circuit of the IR AC switching device from the AC power and propagate the IR communication signal via the light guide to operate the IR AC switching device and the IR AC current sensor.

The method of adding packaged IR AC switching devices and/or the IR current sensor devices to an existing standard electrical switches and outlets instead of replacing them, introduces several major advantages; one is the lowering of the overall cost of the switches and outlets, because standard low cost, mass produced switches and outlets can be used. The second advantage is that the "IR AC devices" provide dual operation, manual operation via the commonly used switches and outlets on one hand and remote operation, in parallel with manual operation, via the IR AC switching devices. These advantages are the other objects of present invention, attained in total harmony and with no conflict between the manual and remote switching operation as described in the pending US applications.

The pending US applications teach the use of two types of switches for AC appliances and light fixture, namely a single pole-double throw (SPDT) switches for on-off switching of a given appliance such as used to switch light fixture from two separate positions. In instances were three or more switches are needed to switch on-off the same light fixture, another type of dual pole-dual throw (DPDT) switches connected in a given straight-cross configuration in between the two SPDT switches described above. The DPDT switches and the DPDT relays are also known as "reversing" or 4 way switches or relays.

Accordingly one of the objects of the present invention is to attach a light guide to an IR controlled SPDT relay connected to an SPDT light switch for operating a light fixture or other electrical appliance, thereby maintaining the operation via a "commonly used" manual switch and provide remote switching via the IR controlled SPDT relay connected to the switch in a given configuration.

Another object of the present invention is to attach a light guide for propagating IR commands and for operating remotely a DPDT relay for switching on-off light fixture or other electrical appliance in a system connected to a manual SPDT switch and to a more comprehensive switching setup that includes two SPDT and one or more DPDT switches.

As explained in the pending US applications, the use of SPDT and DPDT relays as the "add on devices" of the present invention, or in other known home automation's electrical relays, switches and outlets, it will not be possible to identify the on-off status of the appliance, unless the data of all the switches and relays status of a given circuit are transmitted to the controller. This mandates the feeding and recording of all the switch's and the relay's data to the controller during the installation, which is complicated, troublesome and prone to errors. This may cause also complicated data handling and ensuing operational complications, requiring the transmitting of all the data every time a manual switch or relay is activated in the system, and this in return introduces substantial more data traffic and processing.

IR AC switching devices incorporating mechanical relay contacts require large physical size, because the initial current surge may be as high as 10 times the rated current of a light bulb. For example the current drain of a 600 W light fixture, which drains 5 A, may cause a surge of 50 A when it is switched on. Such heavy current calls for large relay contacts and driving current for the relay coil, which is expensive and bulky.

For this reason another object of the present invention is the use of dual triac circuit, termed also SPDT triac for its SPDT switching, because triac can well absorb 10 times surge current. Moreover the use of triac enables to limit the power fed to the appliance to, for example, 95% of the rated voltage, enabling the use of the residual 5% AC voltage to power the CPU for controlling the triacs including the IR receiver and transmitter, thereby providing a low cost and simple attachment of a light guide, and the use of the existing electrical wiring as is, by connecting the IR AC power device to the live AC wire and the load wire, requiring no neutral wire and no changes in the standard wiring of the electrical system.

Another important object of the present invention is the introduction of IR AC current sensor for identifying when the appliance is switched on. The connecting of live AC power line to an electrical circuit mandates a compliance with the electrical safety laws, rules and regulations such as the UL and it cannot be connected to low voltage communication line inside the same electrical box. Therefore the IR AC current sensor of the preferred embodiment of the present invention is not connected to the AC line, instead the current is detected by AC induction, same as disclosed in the pending US applications.

The disclosed IR AC current sensor includes an IR receiver and transmitter for receiving commands to operate an appliance and for transmitting in return the data pertaining the on or off status of the appliance. However, if such appliance is a television and the electrical AC outlet to which the television is connected to is hidden behind the television set, the on-off status of the television set cannot be propagated by the IR transmitter disclosed in the pending US applications, because it will not be in line of sight with the disclosed IR repeater. For this reason the IR AC current sensor is attached to a light guide for propagating the IR signals to the IR repeater disclosed in the pending US applications.

For example a television receiver can be powered via a standard AC outlet, with the live AC wire connecting to the AC outlet for the television receiver passes through said IR AC current sensor. While the power on command to the television may be transmitted via an hand held IR remote control or via an IR repeater disclosed in the pending US applications and/or through the video interphone disclosed in U.S. Pat. Nos. 6,603,842 and 6,940,957 and/or the shopping terminal disclosed in U.S. application Ser. No. 10/864,311.

The IR receiver and transmitter of the IR AC switching device, including the IR AC current sensor through which the AC power is fed, for example, to the television receiver, transmits to the home automation controller, the video interphone or the shopping terminal, via the fiber light guide of the present invention and through the disclosed IR repeater, in return to a power-on command to the television receiver, a reply that a power-on is detected, thereby updating the home automation controller, or said video interphone or the shopping terminal with the television "on status" or "off status" if the command was to switch off the television.

The reference to home automation controller hereafter is to a panel device with control keys or touch screen and circuits similar to the video interphone and/or the shopping terminal disclosed in the pending US applications.

BRIEF DESCRIPTION OF THE DRAWINGS

The foregoing and other objects and features of the present invention will become apparent from the following description of the preferred embodiments of the invention with reference to the accompanying drawings, in which.

DETAILED DESCRIPTION OF THE PREFERRED EMBODIMENTS

Figure 4A:
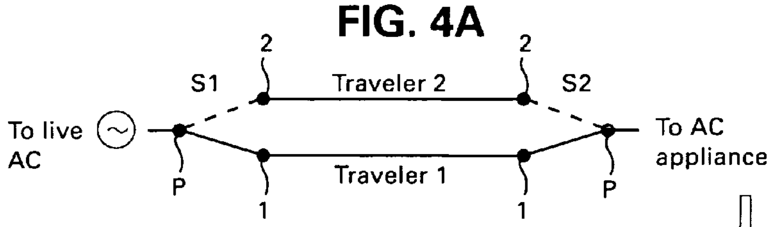
FIGS. 4A~4D are electrical drawings, connections and illustrations of the known common electrical SPDT and DPDT switches and the relays disclosed in the pending US applications for use with home appliances.

Shown in FIG. 4A is a well known basic on-off switching circuit, for switching AC appliances, including appliances such as light fixtures, from two independent switches S1 and S2. The standard on-off switches S1 and S2 are known as a single pole-dual throw (SPDT) switches that includes lever actuated spring contacts for making or breaking the electric circuit carrying AC current to the appliance. Remotely operated switch used for home automation disclosed in the pending US applications is in fact an SPDT relay contacts for making or breaking the AC current fed to an AC appliance, such as the relay assembly 6 of FIGS. 4B and 4D.

Figure 4B:
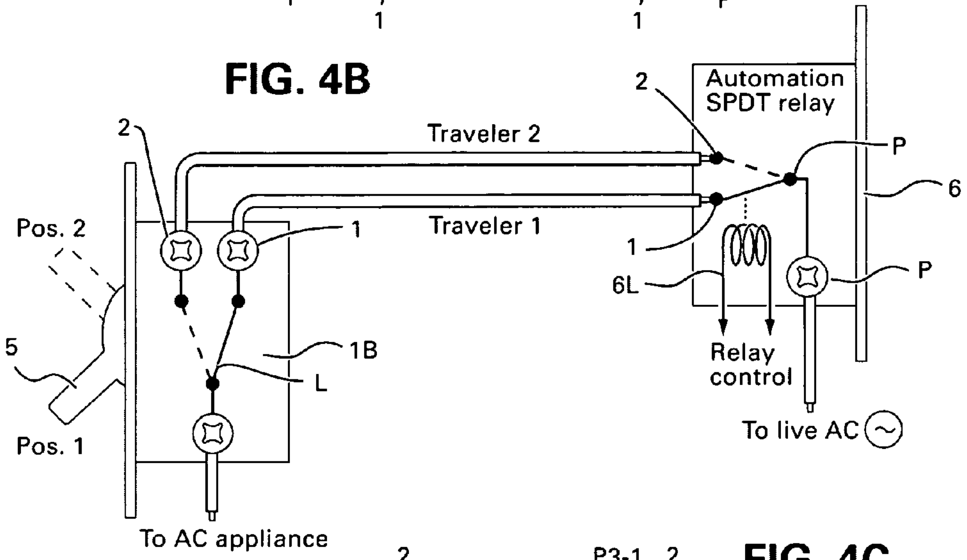
Figure 4C:
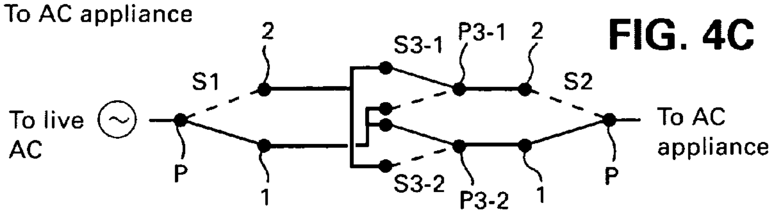
Figure 4D:
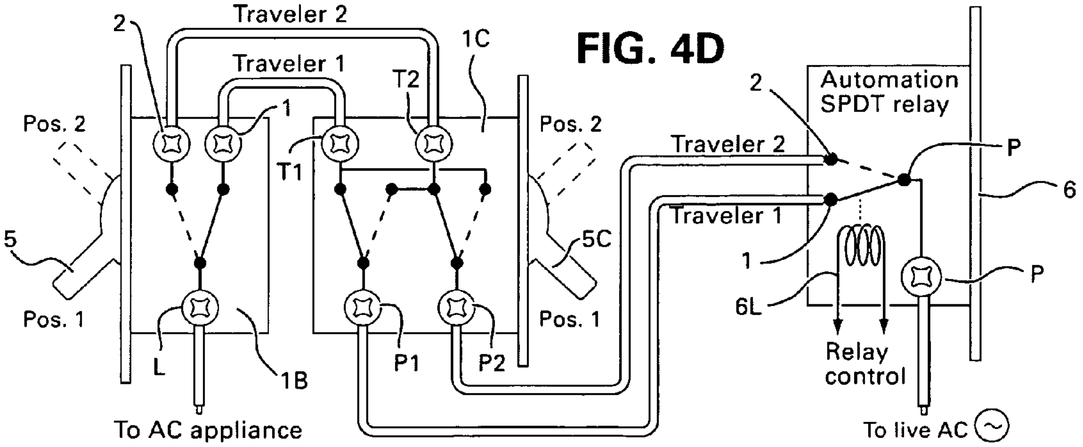

The basic switching circuit of FIG. 4A connects the two switches via two traveler lines and the shown circuit of the SPDT relay assembly 6, disclosed in the pending US applications, is connected via dual traveler lines to a commonly used SPDT AC switch 1B illustrated in a corresponding circuit shown in FIG. 4B for providing two independent on-off switching of an AC appliance, remotely via the relay assembly 6 and manually via the switch 1B. The switching circuits of FIG. 4C and the corresponding switching circuits illustrated in FIG. 4D explain how it is possible to switch a given appliance on-off remotely via the relay assembly 6 and via a manual on-off switch 1B and n number of DPDT switches 1C. The switch S3-1/S3-2 of FIG. 4C, which is the illustrated switch 1C of FIG. 4D is a known dual pole-dual throw switch (DPDT) for connecting the traveler lines straight or cross. As explained in the pending US applications the straight-cross switch over enables n number of switches 1C to be connected in a cascading circuit for manually switching the electrical appliance on-off, independently via any one of the switches.

For error free remote switching of an appliance it is necessary to know the appliance on or off status. It is possible to know the on or off status when using a remotely operated single pole-single throw (SPST) relay, on the basis of the commands fed to the relay driver circuit, but it is far more reliable to provide a returned confirmation data from the appliance by detecting the current drain of the AC appliance. The pending US applications disclose two way IR communications for remotely operating appliances including the receiving of a returned data, however, because of movements within a room may obstruct the line of sight of an IR remote on-off command to a given appliances, including a command from an IR remote control repeater 70 or 90 shown in FIG. 10, the returned confirmation and/or the on or off command itself may become obstructed and unreliable. The IR repeater is also disclosed in the pending US applications.

Another issue is the connections via the travelers 1 and 2 shown in FIGS. 4B and 4D that make the on or off state of either switch lever 5 or 5C unclear and non-defined. This is why the positions of the levers 5 and 5C shown in FIGS. 4B and 4D are not termed on or off, but as position 1 (Pos.1) and position 2 (Pos.2). The inability to have a defined on-off state of either the SPDT switch or the DPDT switch and/or the SPDT relay shown in FIGS. 4B and 4D presents a system reliability issue. The reason for this is the impossibility for the relay to identify the manual switch or switches positions. To provide a reliable on-off status to the video interphone or the shopping terminal, that are controlling the electrical systems of the home automation disclosed in the pending US applications, calls for the use of the current sensor shown in FIGS. 6A~6F and through the dimmer circuits 6MIR, 6M-2 and 6M of the present invention shown in FIGS. 1~3.

Figure 1:
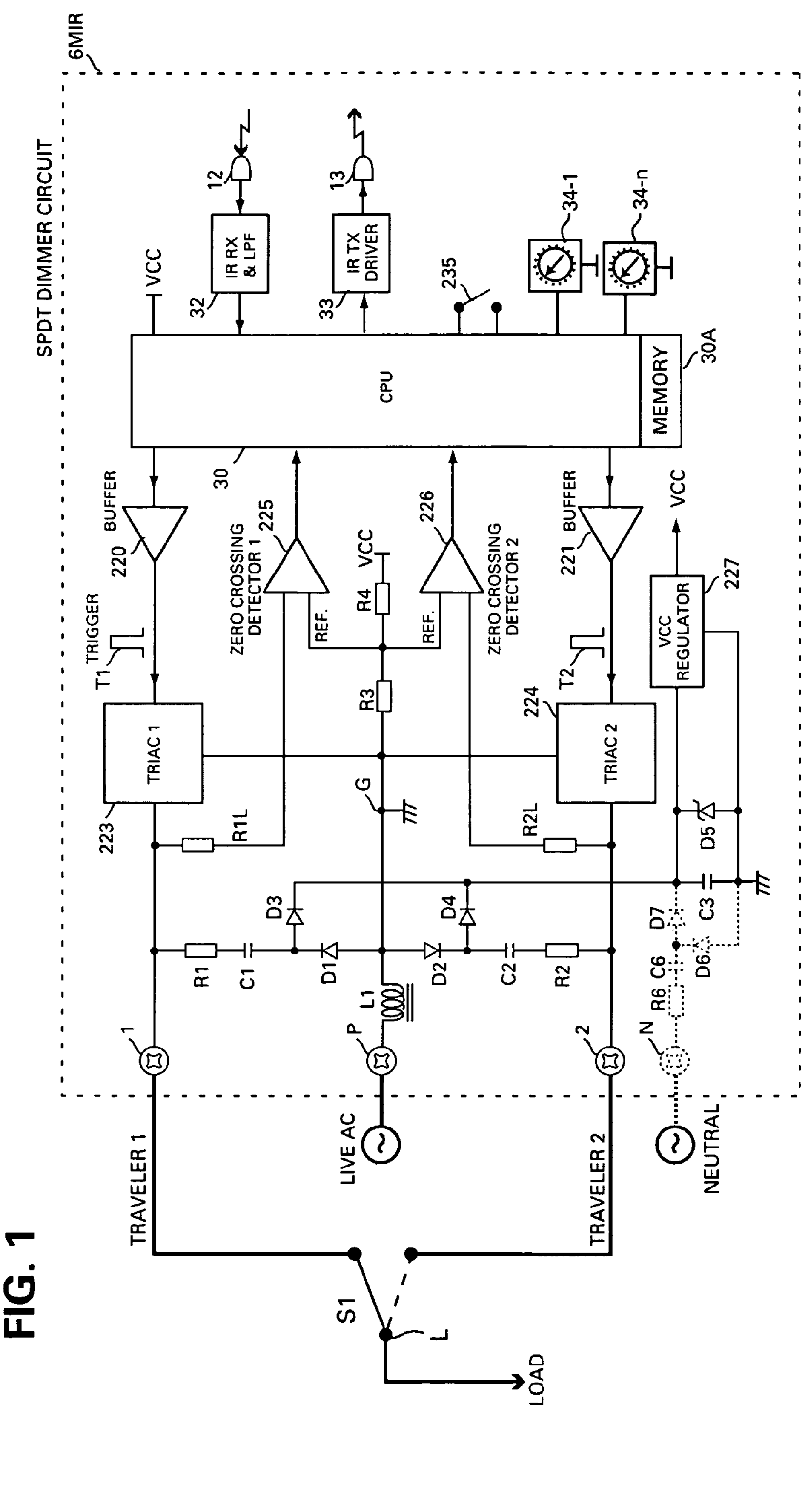
FIG. 1 is an electrical block diagram of a dual triac SPDT switching circuit, controlled via two way IR remote control of the home automation system of the present invention.

Shown in FIG. 1 is a single pole dual throw switching circuit 6MIR including dual triacs 223 and 224 for replacing the SPDT relay assembly 6 shown in FIGS. 4B and 4D. The main reason for replacing the relay 6 with triacs is the large surge current needed to switch incandescent lamps. Current surge for incandescent lamps, for example, may be 10 times the rated power, whereby a 600 W light fixture that drains 5 A (120V) at the rated power, will have a surge current of up to 50 A when its light is switched on. SPDT relays that support 50 A current surges are big, use high power magnetic coil, are very costly and are not practical for a residence home automation system.

The triac switching circuits support high current surges, such as the rush current surges when incandescent lamps are switched on. The well known triac devices 223 and 224 provide for high current surges of over 10 times the rated current and can control the current flow through them, offering the added function such as dimming the lights, by delaying the trigger pulses, timed against the AC power zero crossing. To have the triacs fully conductive (full on state) calls for triggering the triacs at each consecutive zero crossing time.

Figure 10:
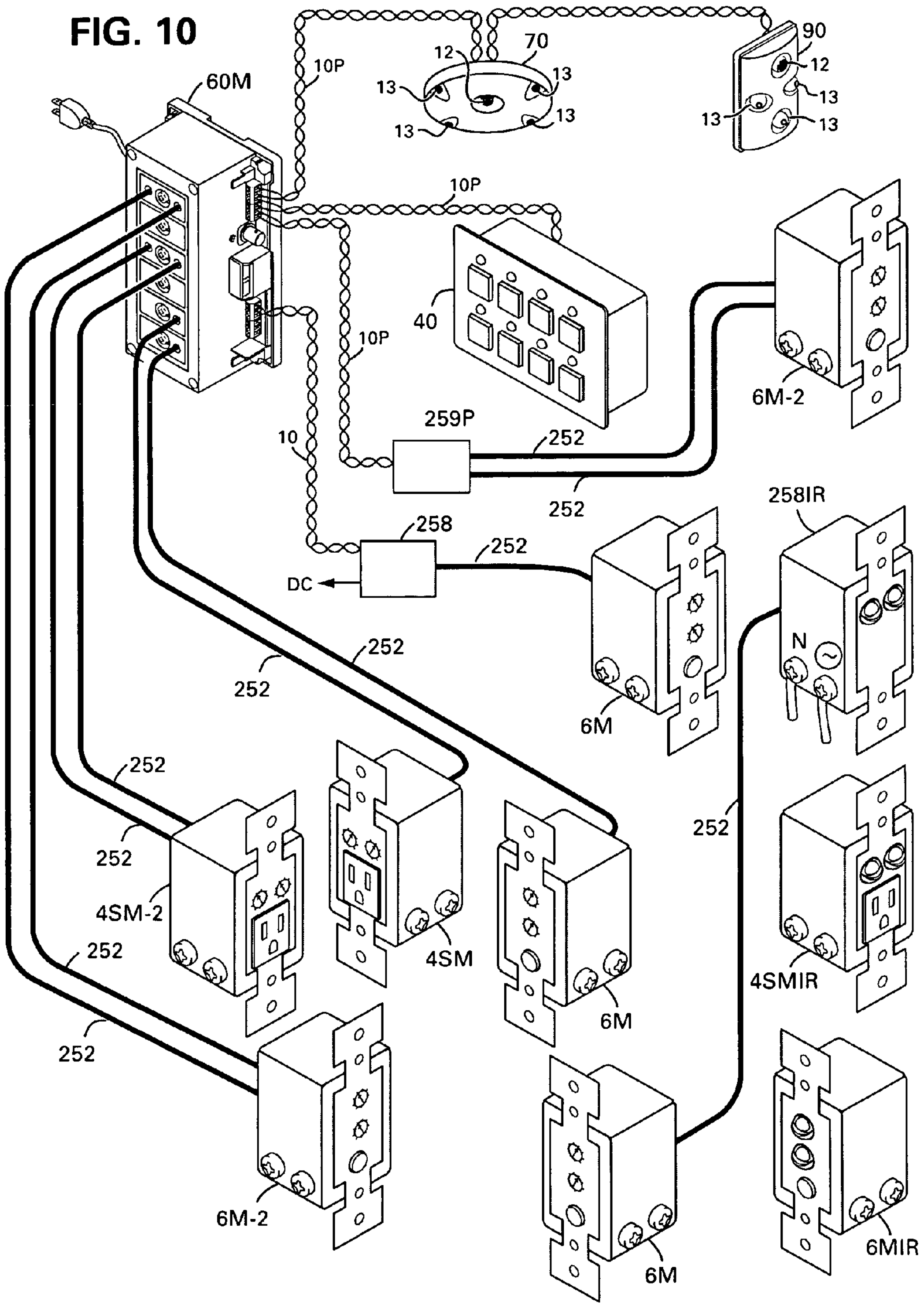
FIG. 10 is a system illustration, summarizing the interconnection of the home automation system of the present invention.

The dual triac switching and dimming circuit 6MIR of the preferred embodiment of the present invention shown in FIG. 1 can be switched on or off via an IR remote control or through an IR repeater/driver 70 or 90 shown in FIG. 10, positioned in a line of sight. The dimmer circuit 6MIR can replace the SPDT relay assembly disclosed in the pending US applications, while an IR remote control device can also control the dimming function of the triacs 223 and 224.

The shown SPDT dimmer circuit 6MIR is connected to a load (appliance) via two traveler terminals 1 and 2 and via the switch pole L of the SPDT switch S1. The live AC line is connected to the ground plane G of the circuit 6MIR through a high current toroidal or other chock coil L1. The DC power for operating the CPU 210 and other internal devices and circuits is drained from the AC power line connected between one of the traveler lines to which the SPDT switch S1 is connected and the ground plane (the live AC line) of the circuit. The AC is drained via two independent rectifier lines R1, C1 and D3 or via R2, C2 and D4 for feeding the rectified power to the zener diode D5 and the VCC regulator 227.

The independent first rectifier line comprising R1, C1 and D1 is shown connected between terminal 1 via traveler 1 (to the load) and the ground plane G, i.e., in parallel to triac 1. The rectifier diode D3 feeds the rectified AC current to the zener diode D5 and the VCC regulator 227. The zener diode D5 ensure stable voltage feed to the VCC regulator 227, and the capacitor C3 is a large, low voltage electrolytic capacitor to filter the 50 or 60 Hz ripple and for storing the rectified DC current for feeding the voltage regulator 227 with peak DC currents needed for operating all of the internal circuits and devices of the 6MIR.

When the SPDT switch S1 is switched over (switching the appliance off) it connects the traveler 2 to the load. This switches the power to the second rectifier circuit comprising R2, C2 and D2, connected between terminal 2 (to the load) via traveler 2 and the ground plane G, i.e., in parallel to triac 2. The rectifier diode D4 feeds the rectified AC current to the zener diode D5 and to the VCC regulator 227. This switch over connections via the traveler lines, between the SPDT dimmer 6MIR and the SPDT switch S1, and the dual rectifier circuits ensures that the rectified AC power is fed to the internal circuits of 6MIR irrespective to the pole position of the SPDT switch.

D1 and D2 are reversed polarity diodes for driving current during the negative cycle of the AC current, while C1 and C2 are low impedance capacitor approved by the respective authorization bodies such as UL (USA) or VDE (Germany) to be connected into live AC power circuit. The capacitors with a capacity from 0.1 Micro Farad and up 0.82 Micro Farad, having a selected impedance, for the 50 Hz or 60 Hz of the power line, for conducting small AC current of several mili Amperes, sufficient to drive all the internal circuits of the SPDT dimmer circuit 6MIR.

Because the rectifier circuits 1 and 2 are connected in parallel to the respective triacs 1 and 2, the voltage across the triac will be the full AC power line voltage, such as 120V in the US or 230V in Europe, when the triac is in off state. When the triac is in full on state, i.e., the triac is triggered to a full conductive state, the residual voltage across the triac will be a practical zero, thereby removing the power source from the rectifier line connected to it in parallel and cutting off the power (VCC) to the dimmer circuits.

For this reason the preferred embodiment of the present invention limits the on state current of the triacs 1 and 2 such that a minimum of 7V~10 VAC residual voltage remains across the triac. Such limits provide on voltages of, for example, 113V AC for US powered appliances and 220V AC for European powered appliances, which represents 94% and 96% efficiency respectively. Yet even these minor deficiencies are simple to overcome by introducing a neutral AC line to the dimmer circuits 6MIR, 6M-2 and 6M of FIGS. 1~3.

As explained above and in the pending US applications the reason for not providing neutral line is the intent to connect the dimmer circuit 6MIR, 6M-2 and 6M in the same way as a mechanical, commonly used AC switch is connected. Since the standard lighting wiring use only live AC and load AC lines, i.e., only two wires are commonly found in the conduits and the back boxes, the intent of the present invention is to use only the commonly existing two wires of the lighting system, with no changes.

Yet, the existing rules and regulations of the known electrical wiring and codes do not prevent the introduction of AC neutral line into the conduit and any of the AC electrical back boxes, and the connections of such AC neutral line to the dimmer circuits 6MIR, 6M-2 and 6M are permitted.

Figure 2:
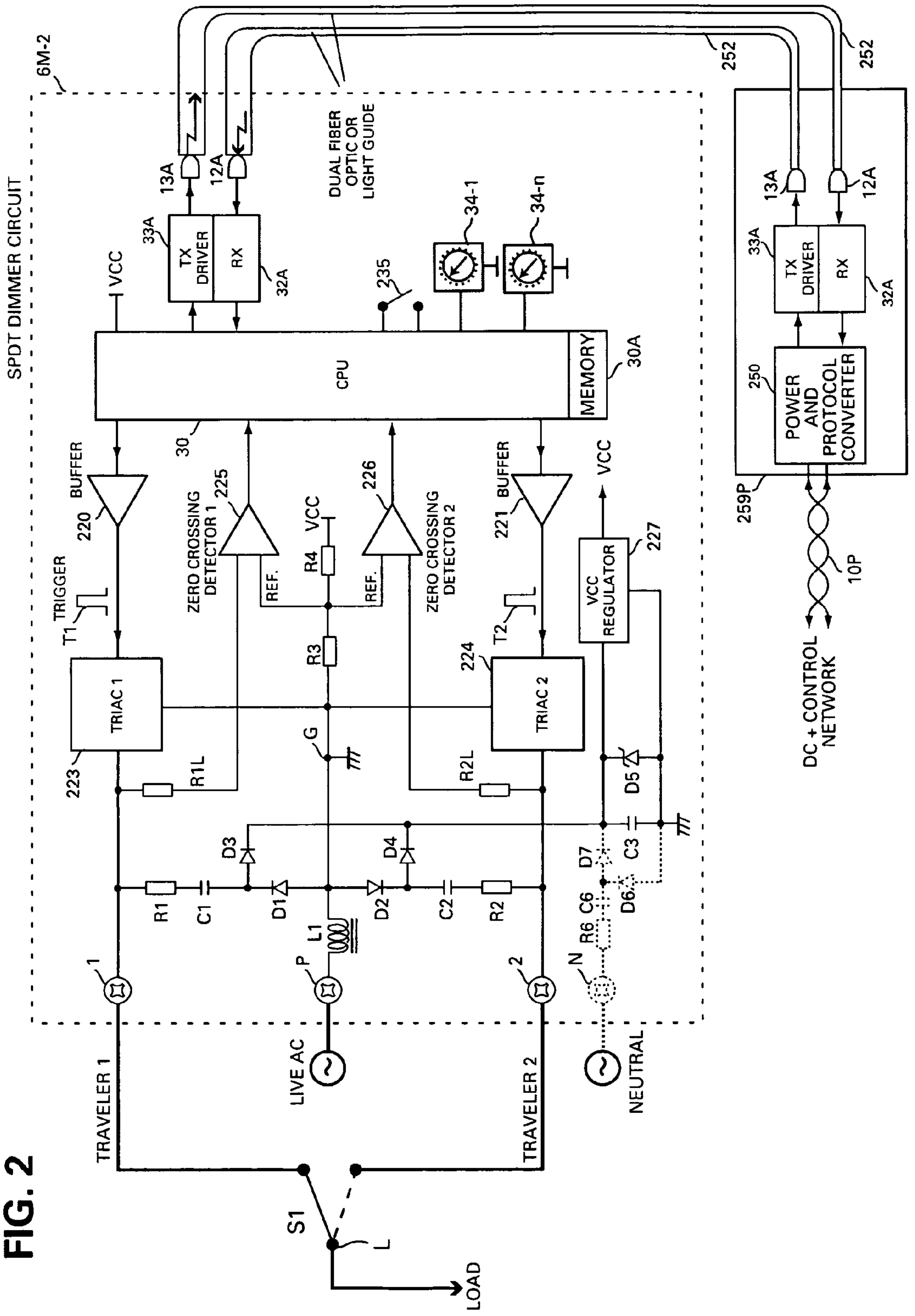
FIG. 2 is an electrical block diagram of the dual triac SPDT switching circuit of FIG. 1, controlled via two light guides or fiber optic cables or of the preferred embodiment of the present system.
Figure 3:
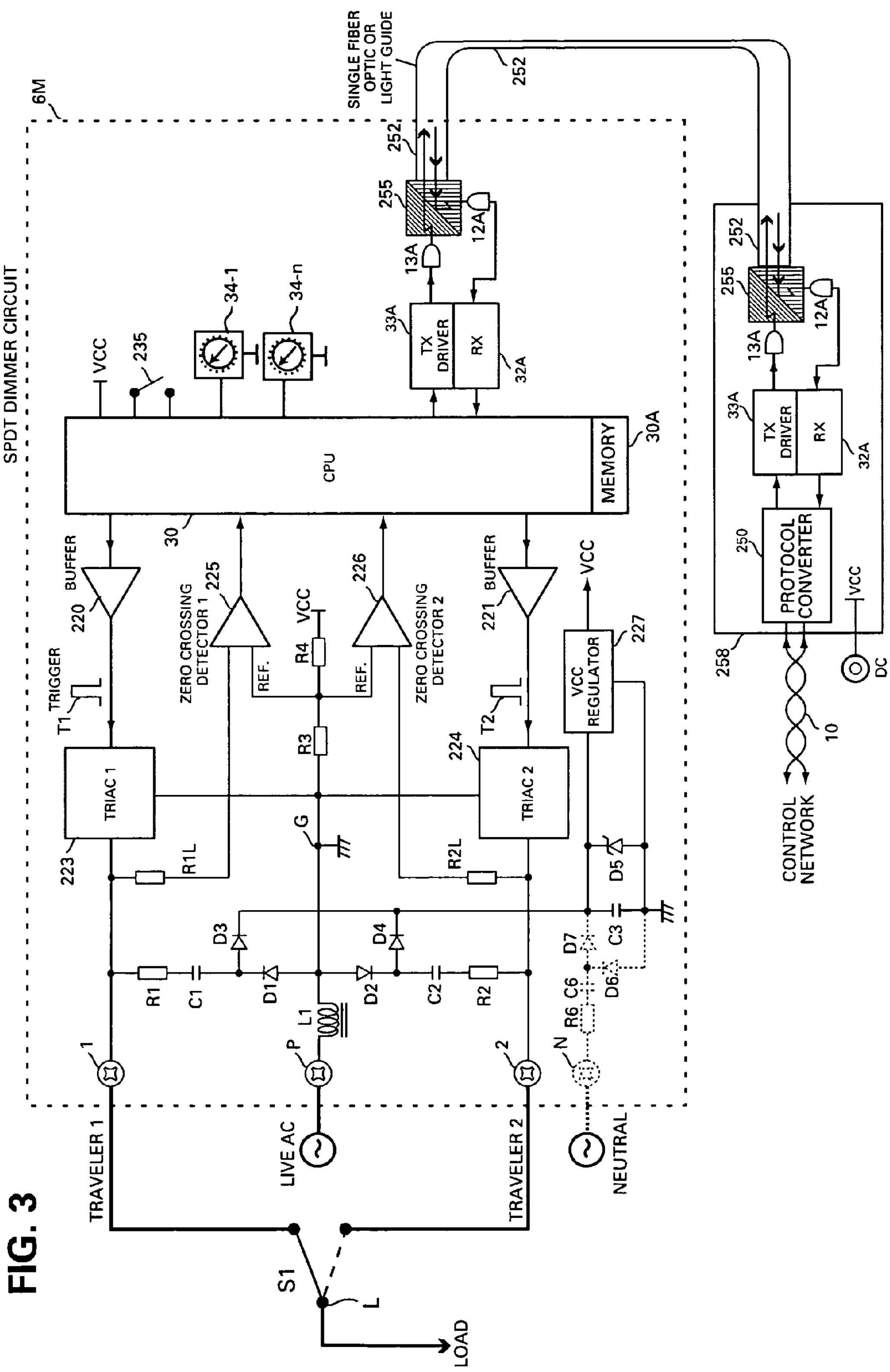
FIG. 3 is another electrical block diagram of the dual triac SPDT switching circuit with a single two way light guide or fiber optic cable of the preferred embodiment of the present invention.

Accordingly, the dimmer circuits 6MIR, 6M-2 and 6M can be provided with neutral terminal N, shown in FIGS. 1~3 in doted lines, for feeding AC current to a rectifier line comprising R6, C6, D6 and D7. This rectifier circuit that is fed by a full AC power (120V or 230V etc.) can use far smaller AC capacitor C6, such as 0.1 μF and thereby eliminate the larger two capacitors C1 and C2 and all the components of the two rectifier lines including R1, R2, D1, D2, D3 and D4 and provide sufficient DC current to the circuits for switching the triacs 223 and 224 to a full on—full off i.e., zero current for off state and 100% current for on state by either one of the two triacs 223 and 224.

Returning back to the preferred embodiment of the present invention, the dimmer circuits 6MIR, 6M-2 and 6M of FIGS. 1~3, shown to be connected between the live AC line via one of the switched traveler to the load, having the current through the triacs 223 or 224 limited to a current that causes a residual voltage drop across the triac to 7V~10V AC. This residual voltage drop becomes the AC power source for the rectifier lines 1 or 2. The low AC voltage levels mandate the use of larger capacitors, i.e., having lower impedance, such as 0.68 μF (Micro Farad) in order to feed sufficient rectified current to the VCC regulator 227. Accordingly, the capacitors C1 and C2 are differently selected for the different dimmers used in the different countries, providing a maximum current through the triacs 123 or 124 and programming the CPU 30 to operate the triacs as close to 100% efficiency as possible. The efficiency is also achieved by the use of internal components, devices and circuits that consume low current, such as the shown circuits in FIGS. 1~3.

From the above description it becomes clear that the SPDT dimmer circuits 6MIR, 6M-2 and 6M can be installed into a standard electrical AC boxes and wired into standard, commonly used electrical wiring without any changes being made to the basic wired electrical systems, and that the triacs can be switched on for powering the appliances, such as light fixtures with 94%~96% efficiency depending on the rated AC voltage standard of a given country, state or a region.

On the other hand the introduction of a neutral AC line to the dimmer circuits 6MIR, 6M-2 and 6M provides the dimmers with a rectifier circuit that enables the triacs 223 and 224 to switch the power on to its 100% efficiency.

As explained above the well known triac 223 or 224 switches on by feeding a trigger pulse T1 or T2 to the triac trigger terminal. The trigger switches on the triac for a duration until the next zero crossing of the AC power line. For a full 100% switch on periods the triacs must be re-triggered at each zero crossing with no delay. To dim the light the triac is fed with a delayed trigger. The time delay can be calculated on the basis of the AC line frequency such as the 60 Hz in the US and 50 Hz in Europe or other countries. The time duration between two zero crossings for the 60 Hz of the US is 8.33 mili seconds (half of one sinusoidal cycle of 16.66 m sec.) and for the 50 Hz of the EC is 10 mili seconds (half one sinusoidal cycle of 20 m sec.) respectively, of the AC power frequency.

The delay (as selected) in triggering the triac switches the triac on with a sharp rise or fall time that causes sharp switching current and noise. Such noise is reduced or eliminated by the use of large chock coil L1, using toroidal and other well known AC chokes and variety of AC capacitors, ferrites and other noise filters (not shown).

Shown in FIGS. 1~3 are the zero crossing detectors 225 and 226, each comprises a comparator circuit connected to a resistor R1L and R2L respectively for feeding each comparator with an AC signal of each traveler line 1 or 2. The comparators of the zero crossing detectors 225 and 226 are fed with a reference DC level, using the resistors R3 and R4 divider for introducing a predefined DC reference between the ground plane level (of the live AC) and the VCC, for detecting the zero crossing of the AC line and moreover, detecting which of the two traveler lines is connected to the load via the SPDT switch S1.

The resistors R3 and R4 values are pre-configured such that the comparator circuit 225 or 226 will reverse its state whenever the AC voltage level, in either the positive or the negative sinusoidal curve, intersects the zero crossing point. Irrespective of when the comparator reverses its state from positive to negative or vice versa from negative to positive, such change of state becomes the zero crossing reference point fed to the CPU 30. The potential of the other non connected traveler line 1 or 2 (open line) is essentially the same potential as the ground plane potential, and thus will not cause the comparator circuit 225 or 226 to reverse its state. Accordingly the CPU is fed with zero crossing data only from the comparator associated with the traveler line 1 or 2 that is connected via the SPDT switch S1 to the load.

It is clear therefore that the CPU is refreshed with the zero crossing time and is updated with the identification of which traveler line is connected to the load. The CPU can therefore generate a trigger pulse T1 or T2 on the basis of the zero cross timing, the connected traveler 1 or 2 and the received command on or off or a given dimmer level that is fed to the CPU 30 through the IR remote control receiver 32 via the IR photo transistor or photo diode 12.

The trigger pulse T1 or T2 are fed to the trigger input of the triac 223 or 224 respectively with no delay for on command and with a programmed delay, commensurating with a received dimmer setting level command from an IR remote control device. When an off command is received the CPU 30 will stop feeding the trigger pulse T1 or T2 to the triac that is connected through a traveler 1 or 2, with the load (appliance) via the SPDT switch S1. Instead the CPU will feed a non delayed, i.e., full on trigger pulses to the other, the “non connected" triac. This enables the user to switch on the appliance via the manual SPDT switch S1 by switching over the switch lever from pos.1 to pos.2 or vice versa. This can also switch the appliance on via the IR remote control by a command to trigger the switched off triac. Such ability to freely switch the appliance via the commonly installed manual switch and via an IR command through the home automation networks is similar to the disclosed on-off switching in the pending US applications.

Moreover the CPU 3D is able to confirm if the load is connected to a switched on triac, switched off triac or "dimmed" state triac, thereby the CPU can positively identify the on or off or dimmed status of the appliance and feed such data via the IR driver 33 and the IR transmitter 13 to the system controller, to a shopping terminal or to the video interphone disclosed in the pending US applications.

When the user switches off the appliance via the SPDT switch S1, the CPU receives the zero crossing data through the newly connected traveler 1 or 2, but the CPU will memorize via its memory 30A the last entered trigger timing (switching over the mechanical switch S1 does not change the last received command memorized in the memory 30A), therefore the CPU will continue to feed repeatedly the on or a dimmer level command to the triac 223 or 224 that is no longer connected, on the basis of the zero crossing data fed from the other traveler line that was manually switched over to. This enables the use of dual triacs circuits 6MIR, 6M-2 and 6M in combination with the manual SPDT or DPDT switches for providing both a manual and a remote switching on-off, fully compatible with and a replacement to the disclosed relays in the pending US applications.

The trigger T1 or T2 fed by the CPU is buffered via the buffers 220 or 221 respectively for feeding a pulse level and current needed to trigger the triacs 223 and 224. The buffer is a well known buffer amplifier, such as transistor or IC, however depending on the level and the current capacity of the I/O ports of the CPU 30, the buffers 220 and 221 may not be needed and not used, in which case the trigger pulses T1 and T2 are fed from the CPU 30 directly to the triacs 223 and 224 trigger inputs.

The IR receiver 32, the photo transistor or photo diode 12, the IR driver 33 and the IR transmitter or LED 13 are well known circuits and devices, commonly available indifferent IC or discrete packages, encapsulated with IR pass filter and/or low pass filters. The IR receiver and transmitter circuits 32 and 33 are also disclosed in the pending US applications, for communicating IR signals in air and in line of sight, such as used by hand held remote control and via IR driver.

The shown rotary digital switches 34-1 and 34-n are address setting switches for identifying the room or zone in which the appliances are located and the type of the appliance and are also disclosed in the pending US applications. The switch 235 is a select switch such as a tact switch or a key for manually operating the dimmer by keying the dimmer level, one step at the time and one step after another in rotation, up-down or such as on-down-off or off-up-on and the like. Though the key or switch 235 is shown as a single key or switch, a plurality or set of keys, such as on, off, and preset dimmer level keys, switches or potentiometers can be used, providing direct switching and dimming selection through a given selector, key or button.

FIG. 2 shows an SPDT dimmer circuit 6M-2, having identical or similar circuits and devices employed in the SPDT dimmer 6MIR, with the exception of the IR RX and LPF 32 the photo transistor 12, the IR TX 33 and the IR transmitter or LED 13. As will be explained later, the preferred embodiment of the mechanical structure of the dimmer 6MIR however is also different from the structure of the dimmer 6M-2 shown in FIG. 2

The two way remote communication between the command converter 259P and/or the TX/RX drivers 33A and 32A of the home automation system and the dimmer 6M-2 of FIG. 2 is structured for communicating via dual light guides or fiber optic cables 252. Fiber optic cables can propagate efficiently the commonly used IR signals in the 850 nm or 940 nm wavelength band or spectrum. Therefore the TX driver 33A, the transmitter 13A, the RX and LPF circuit 32A and the photo transistor or photo diode 12A shown in FIG. 2 can be an identical or similar to the IR TX driver 33, the IR transmitter 13, the IR RX and LPF circuit 32 and the photo transistor or photo diode 12. The difference will be in the physical/mechanical structure of the transmitter 13A and the photo transistor or diode 12A that are fed via such fiber optic cables, versus the transmitter 13 and the photo transistor or diode 12 that communicate via open air in a line of sight.

In contrast when using light guide cable instead of the fiber optic cable, the use of the visual spectrum band is much more efficient. Light guide is manufactured for example by Toray. Industry. The light guide cables are efficient in the red wavelength, in particular the least attenuated wavelength is the red color in the 650 nm band. The advantages of the light guide versus the fiber optic cables, within the context of home automation communications are many.

The light guide can be used with acceptable attenuation for up to 50 meter or 160 feet. The light guide can be bended into radiuses as small as 5 mm or 0.2 inch. It is soft and can be fed into conduit and it is not flammable and therefore can be loosely fed onto drop ceilings or behind paneled walls. Light guide does not require the termination processing of fiber optic cables, it can be cut by a sharp knife and requires no polishing and no lapping process. The cut surfaces end's of the light guide cables can be literally attached to the emitting surface of a low cost red LED 13A and to the receiving surface of a low cost visual spectrum photo transistor or photo diode 12A. The light guide cable end can be glued or crimped onto a self locking plastic plug (not shown), or otherwise attached to the LED 13A and to the photo transistor or diode 12A as shown in FIGS. 7E~7G and 8A~8F, without the use of the high precision connectors of the commonly used fiber optic cables. The light guide cables can be attached to position by screws, simple plastic molded holders or self clamping into position, such as the examples shown in FIGS. 7F, 7G, 8A~8F and 9A~9B.

The propagated protocol via the light guides or fiber optic cables can use the same protocols as used by the IR remote protocol to the dimmer 6MIR and the confirmation reply from the dimmer 6MIR. Alternatively a modified protocol or different protocols, structure and speed for communicating with the dimmers 6M-2 and 6M of FIGS. 2 and 3 can be employed. The preferred dimmers embodiments shown in FIG. 1, FIG. 2 and FIG. 3 use identical protocols, with simplex communication (at a slow baud rate such as 1200 baud) for the command and confirmation exchanges between control devices and appliances in the same room or zone.

The combined two way TX-RX driver/receiver 33A and 32A, that is also referred to as a transceiver, of the command converter 259P feed and receive the protocols via the LED 13A and photo transistor or diode 12A, reciprocal to the LED 13A and the photo diode 12A of the dimmer circuit 6M-2. The command converter 259P further exchanges the communication protocols with the home automation system distributor 60M (shown in FIGS. 9A and 9C) via the twisted pair communication line 10P, which also feeds the DC power for operating the command converter 259P. A command converter 259P can be incorporated for example inside IR wall driver 70 or IR ceiling driver 90 for communicating with the relay disclosed in the pending US applications, the dimmers of the present invention or the current sensors via optical guides or fiber optic cables 252 in addition to via IR in line of sight. The ceiling or wall driver devices are shown in FIG. 10 and are fully explained in the pending US application. The difference between the driver devices of the pending US applications and the drivers of the present invention is the use of visual spectrum communications such as red light in the 650 nm wavelength, and the connection via the light guide or fiber optic cables in addition to, or instead of the IR communication, in line of sight.

The dimmer circuit 6M shown in FIG. 3 is electronically identical with the circuits 6M-2 and so are the command converter 258 and the two way TX-RX driver/receiver 33A and 32A, which are identical with the command converter 259P and the two way TX-RX driver/receiver 33A and 32A or transceiver of FIG. 2. The difference between the two dimmers and the control circuits is the introduction into the dimmer 6M and the command converter 258 of a half mirror optical prism 255 for communicating the two way signals via a single light guide cable 252.

The prism 255 shown in FIG. 3 inside the dimmer circuit 6M and the command converter 258 is a well known optical prism, known also as half mirror prism. The prism 255 deflects the received light or IR signals to the surface of the photo transistor or diode 12A via the half mirror created by the half mirror surface coating of the combined prism and passes through the transmitted light, within the visual spectrum or the IR signals, from the transmitting LED 13A surface. The shown prism can be constructed of two pieces of different glass materials, coated and bonded, or it can be an injected two pieces of clear and transparent plastic materials. Many different techniques can be applied for constructing the prism 255, shown in FIG. 3 as a large prism, far bigger than the LED, the photo transistor and the light guide, but in practice a small plastic molded structure with a well known polarized coating at one end can be used, and such coated plastic structured prism is used in the preferred embodiment of the present invention.

In the following the term “transceiver” may refer to a TX-RX circuits 33A and 32A including the LED 13A, the photo diode 12A with or without the prism 255. Because the two way communications via the prism are conducted in a simplex communication which enables a receive only state, or transmit only state, the cross talk or leakage of light signals from the transmitter 13A to the receiver 12A or vice versa, wherein a portion of the received signal reaches the surface of the transmitter 13A or leakage of a transmitted light reaches the photo transistor 12A surface, becomes non important and immaterial. The importance is that the intended direction is not attenuated severely by the prism 255. Such prism structure is obtained by the injected plastic method with good results and at a low cost. However well known prisms 255 with low cross talk can be used for communicating two way duplex signals, when duplex communications are needed.

Figure 5A:
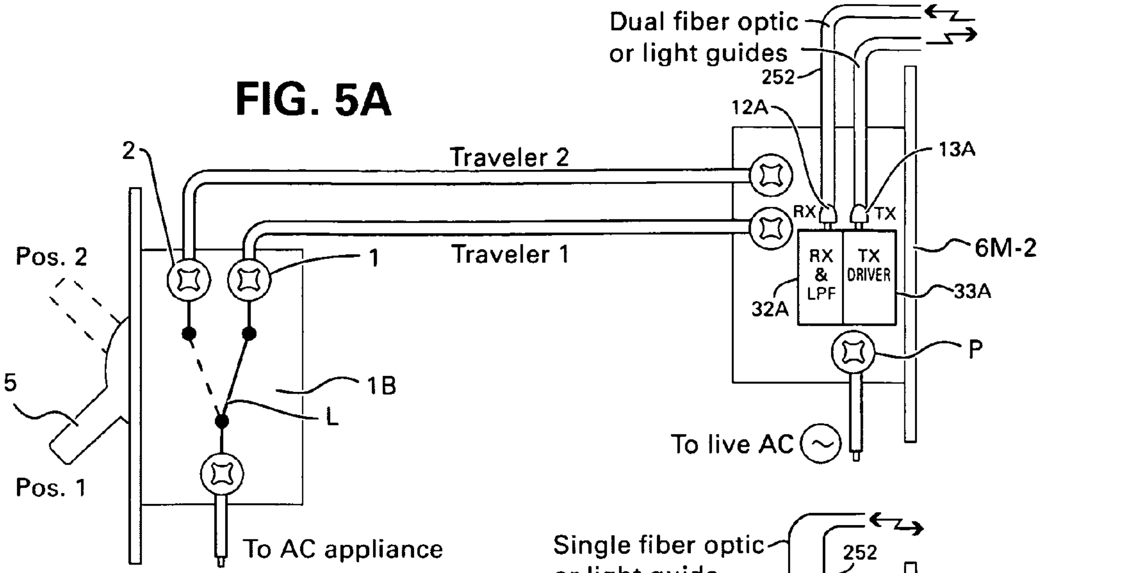
FIGS. 5A~5C are electrical drawings, connections and illustrations of common SPDT and DPDT switches including the dual triacs circuits shown in FIGS. 2 and 3 with two way communications via single or dual light guides or fiber optic cables of the preferred embodiment of the present invention.

FIG. 5A illustrates the dimmer 6M-2 being connected to an SPDT switch 1B for switching an appliance on-off or for dimming a light fixture, wherein the dimmer 6M-2 can be installed into an electrical back box (not shown) close to the switch 1B and interconnect via the traveler lines 1 and 2 and to the live AC within the electrical boxes. The dimmer 6M-2 is shown to support the two way communication with a control circuit (not shown) via dual light guides or fiber optic lines 252, fed with confirmations and statuses via the TX 13A, driven by the TX driver 33 and receive the on-off and dimmer level commands through the photo transistor or diode 12A and via the RX circuit 32.

Figure 5B:
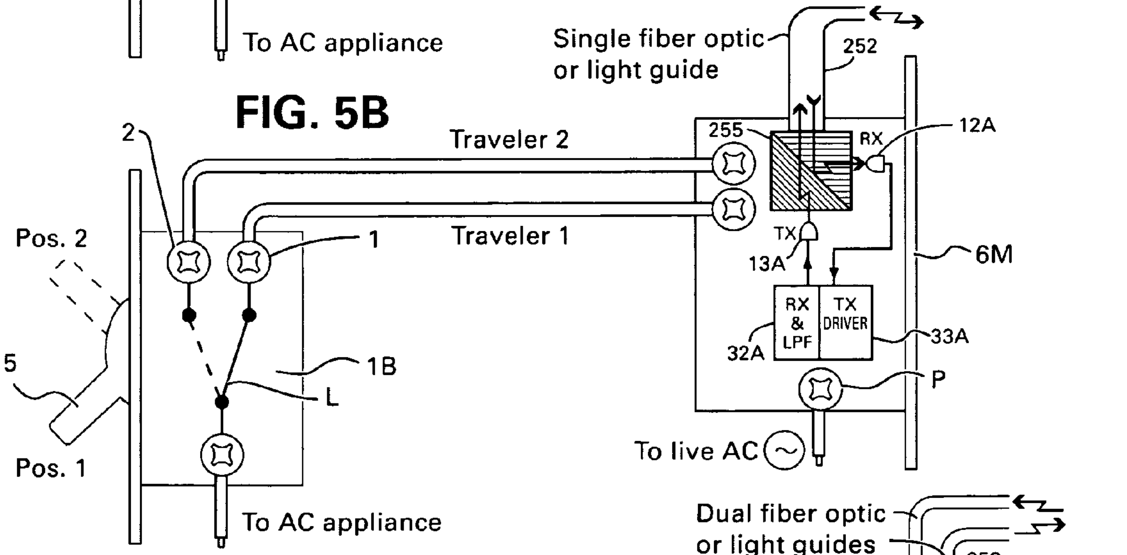

FIG. 5B illustrates the dimmer 6M having the same electrical circuit shown in FIGS. 2 and 5A, the difference is only in the two way communication propagated via a single light guide or fiber optic cable 252 using the prism 255 also shown in FIG. 3. The prism 255 directs the received commands to the photo transistor or diode 12A and the returned confirmation or statuses through the LED 13A. Outside this addition of the prism 255, the dimmer circuit 6M operates the same way as the dimmer 6M-2 and 6MIR explained above.

Figure 5C:
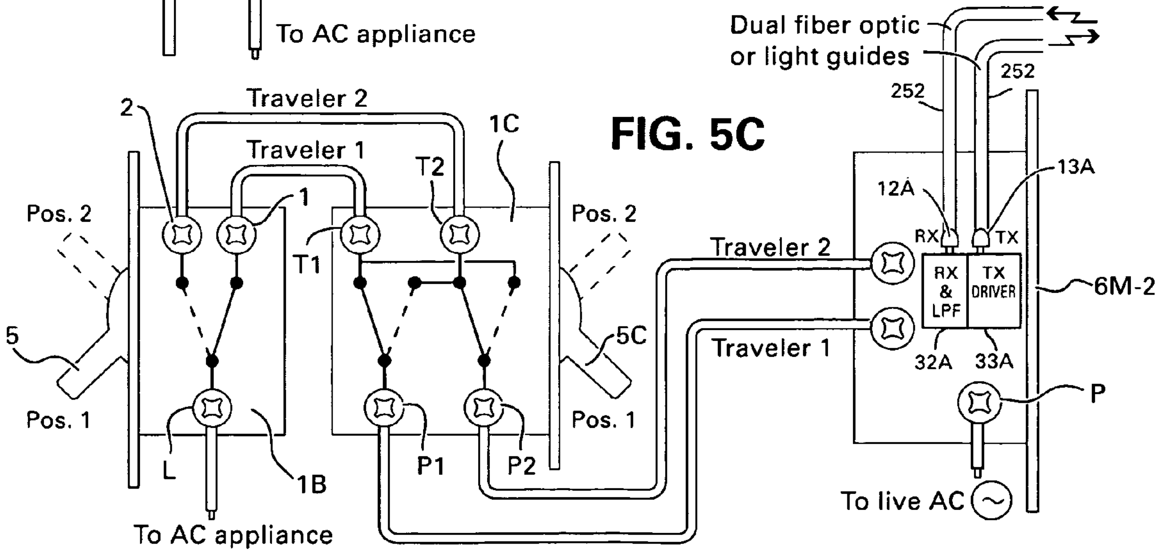

FIG. 5C illustrates a switching circuit incorporating one DPDT switch 1C for providing additional manual switch or switches to the SPDT switch 1B. Even though not shown, n number of DPDT switches 1C can be cascaded through the traveler lines 1 and 2, with each such switch can independently, irrespective of other switches or the dimmer position, switch the appliance on-off. This is because the DPDT switch reverses the traveler lines connection from straight to cross or vice versa from cross to straight.

Outside the DPDT switch addition the dimmer 6M-2 is identical in every respect to the dimmer 6M-2 shown in FIG. 5A. It becomes obvious from the above explanation and the illustration of FIGS. 5A~5C that the dimmers 6M-2 and 6M can be installed inside electrical boxes and be connected via two travelers, live AC line or AC load line and process two way control communications via light guide or fiber optic cables. It is also obvious that such dimmers comply with the electrical codes and can be operated remotely via the home automation control circuits or manually via the commonly used SPDT or DPDT switches.

Figure 6A:
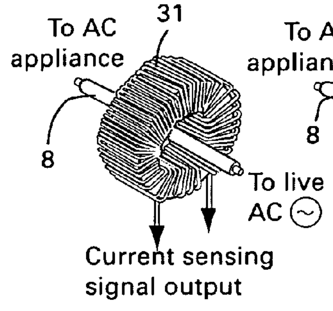
FIGS. 6A~6F are electrical drawing, block diagram and illustrations of the current sensing coils and structures of the preferred embodiment of the current sensors, including an AC outlet of the present invention.
Figure 6B:
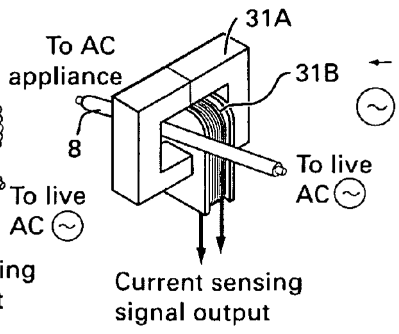
Figure 6C:
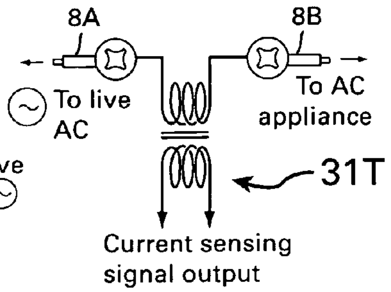

Shown in FIG. 6A and FIG. 6B are two current sensing coils, a toroidal coil 31 and a coil assembly including coil 31B and a ferrite core 31A. The current sensing coils of FIGS. 6A and 6B are used for sensing the AC current fed through the AC wire 8 by induction. FIG. 6C shows a current transformer 31T that outputs a signal corresponding to an AC current fed through its primary coil and through the intersected AC wire 8A and 8B. The coils 31 and 31B and the current transformer 31T are disclosed in the pending US applications and are only briefly explained above. The pending US applications describe the different current sensors assemblies that are powered by a low voltage DC, fed along with two way propagated communication signals, via a twisted pair wires.

The current sensors assemblies using the coils 31 and 31B disclosed in the pending US applications are not connected to the AC power line and therefore can be mounted into electrical boxes accommodating low voltage wires. However, nothing is said in the electrical and safety codes and rules, such as published by the UL, about current sensors as disclosed in the pending US applications, because such current sensor assemblies never existed before. This represents a complex uncharted territory of electrical codes, rules and regulations. Accordingly the present invention covers AC current sensors shown in FIGS. 6D, 6E and 6F and similar current sensors combinations that are powered by the AC power line. AC powered devices are the subject of the electrical codes and can be processed for safety approval and used in homes, residences and offices and be mounted into standard electrical boxes side by side with AC switches, outlets and other AC devices.

Figure 6D:
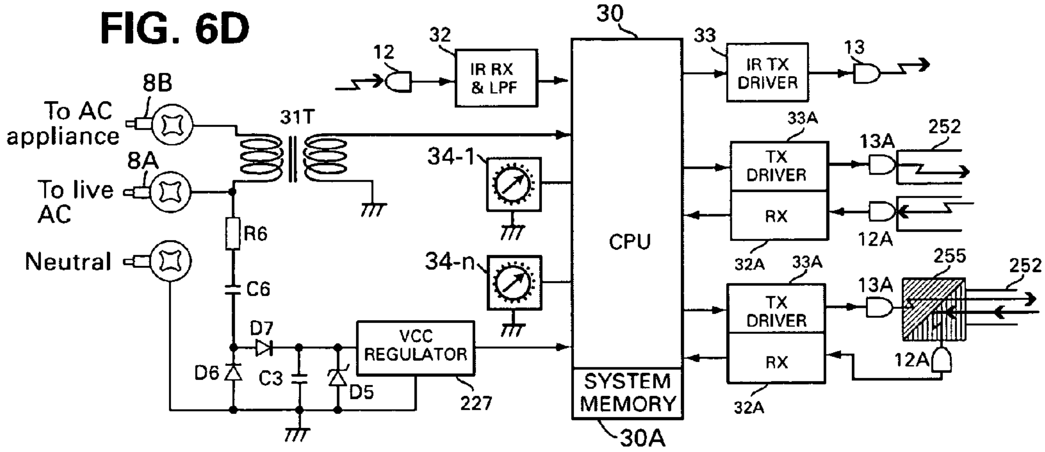
Figure 6E:
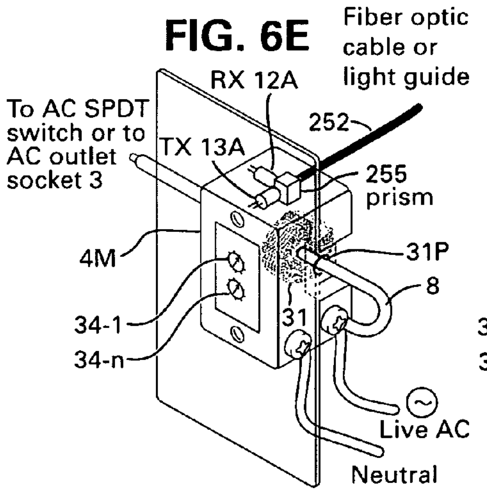

FIG. 6D shows the block diagram of the AC current sensor assemblies 4M, 4M-2 and 4MIR of the preferred embodiment of the present invention. The shown current sensing device is the AC current transformer 31T, however the shown current sensing device in FIG. 6E is a toroidal coil 31 that can be used instead of the AC current transformer 31T. Similarly any other current sensing coil structure such as the coil assembly 31A/31B of FIG. 6B or any other circuit or device that generates signal output corresponding to the AC current drain by the appliance can be used.

Figure 6F:
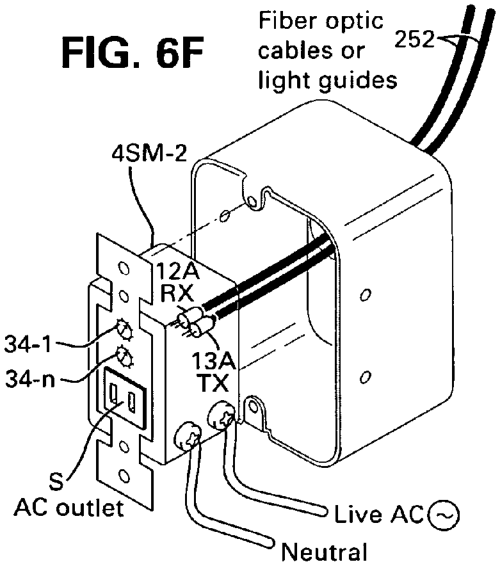

The current sensors 4M, 4M-2 and 4MIR can be similar to the current sensors disclosed in the pending US applications or a range of current sensors that are built into or are an add on to an AC outlet socket, or are an integral part of an AC power outlet or socket, such as the integrated 4SM socket/sensor assembly. The integrated AC current sensors including 4SM that is connected via single fiber optic cable or light guide (not shown), the 4SM-2 connected via two fiber optic cables or light guide that is shown in FIG. 6F and the 4SMIR that communicates IR signals in line of sight shown in FIG. 6D. The current sensors of the present invention offer a simple low cost and as explained below, simple to set and operate. They offer also the ability to monitor all appliances and current consuming devices in the residence, office or factories and set-up centralized control to reduce unnecessary current drain by unnecessarily operating electrical appliances.

FIG. 6D shows the rectifying circuit for feeding regulated DC to the CPU 30 and to the associated circuits of the shown current sensors 4M, 4M-2 and 4MIR, and for the integrated current sensors 4SM, 4SM-2 and 4SMIR that are not shown in FIG. 6D. An example of the 4SM-2, combining current sensor and AC outlet socket S in one integrated unit, is shown in FIG. 6F. This integrated current sensor 4SM-2 similar to all other current sensors of the preferred embodiment of the present invention employ a similar rectifier and power regulation circuit shown in FIG. 6D. The rectifier circuit comprising R6, C6, D6, D7 and the regulation circuit comprising C3, D5 and VCC regulator 227 are fully explained above and are shown in dotted lines in the dimmer circuits 6MIR, 6M-2 and 6M of FIGS. 1, 2 and 3.

The current transformer 31T shown in FIG. 6D can be replaced by the toroidal coil 31 shown in the current sensor 4M of FIG. 6E. The current sensor 4M is similar to the current sensors disclosed in the pending US applications, with the exception of the DC powering circuit discussed above and the two way control and data signal propagation, shown in FIG. 6E as propagated via single fiber optic cable or light guide 252. The disclosed current sensors in the pending US applications propagate the two way signals via IR in line of sight, via wireless RF and via a wired network of a twisted pair wires.

FIG. 6D shows the two way IR communication circuits comprising IR RX 32 with photo diode or photo transistor 12 and IR TX 33 with IR LED 13. It further shows the two way visual spectrum communications via light guides 252, comprising RX 32A with photo diode or photo transistor 32A and TX 33A with visual spectrum LED 13A. The shown two way IR communications are propagated in open air and in line of sight, while the visual spectrum communications are propagated via the two light guide cables 252.

Even though FIG. 6D does not cover all the communication options, the combined presentation by FIGS. 6D, 6E and 6F demonstrate clearly that any combinations of IR or visual light propagations are possible. This includes the use of a single or dual fiber optic cables 252 and/or the use of a single or dual light guide cables 252, by providing the corresponding TX and RX circuits 32 and 33, or 32A and 33A, along with the corresponding photo diode or photo transistor 12 or 12A and LED 13 or 13A. The inclusion of the prism 255 shown in FIG. 6E that is fully explained above and shown in FIGS. 3 and 5B, makes it obvious that a single or dual fiber optic or light guide cables 252 can be used.

The difference between the two way IR and visual spectrum drivers and receiving circuits, comprising IR RX 32 and IR TX 33 versus the two way visual spectrum circuits comprising RX 32A and TX 33A, concern mainly the carrier frequency. The commonly used carrier frequency for IR remote control devices is 38.5 KHz. However other carrier frequencies such as 40 KHz~60 KHz, or any other frequency in up to the 100 KHz range or higher, are used and can be used with the present invention. It is important to note that the carrier is encoded or AM modulated by the IR TX driver 33 using commands and data protocols that are stored in the memory 30A of the CPU 30 of FIG. 6D. On the other hand the IR receiver 32 include a decoder or detector for decoding the envelope of the received commands or data, or for detecting the demodulated command for outputting the envelope of the communicated command or data.

When a slow baud rate signals are propagated for switching LEDs (visual or IR) on-off and when such light or IR signals are propagated from point to point via light guides or fiber optic cables, it is far simpler to generate only the envelopes of the control commands and statuses. The communication circuits are simpler because there is no need to generate carrier signal or to modulate the carrier signal, nor to demodulate the received signal. Accordingly a carrier frequency generator as well as encoding or modulating and decoding or demodulating circuits are not needed and are not used. Instead the CPU 30 can generate and feed directly to the LED 13A or via a simplified driver 33A IR or light pulses i.e., the envelopes of the protocols. Similarly the photo diode 12A can be directly connected to the CPU 30 or via a simplified RX 32A, providing two way exchange of commands, statuses, confirmations and other data. Such substantially simplified processing circuits are incorporated in the CPU 30 and the TX and RX circuits 32A and 33A, thereby substantially cutting the hardware of the signal processing chain, reducing the components needed and the total cost of the current sensor assemblies, the AC relays and the dimmer circuits, providing lower costs products with greatly improved accuracy, performance and reliability.

The CPU 30, the memory 30A, the IR receiver and transmitters 32 and 33 and the switches 34-1 and 34-n that are used to set a room or zone address and identify the connected appliance, the current sensors 31T, 31 and the coil assembly 31A/31B along with the current detection processes are fully disclosed in the pending US application and are incorporated herein by reference.

When IR signals are communicated in line of sight, the visual spectrum circuits and devices 32A, 33A, 12A and 13A shown in FIG. 6D are not needed and are not used, alternatively when fiber optic or light guide cables are used, the IR receiver and transmitter circuits and devices 32, 33, 12 and 13 are not needed and are not used. Otherwise the current sensor assemblies 4M, 4M-2, 4MIR, 4SM, 4SM-2 and 4SMIR along with the dimmer circuits 6M, 6M-2 and 6MIR and the relays disclosed in the pending US applications share common programs, embedded into the CPU 30 and/or into the memory 30A. All the referred above devices communicate and operate using same protocols, making the system simple to use and operate, however different programs can be made, having varying protocols as the need may arise.

When propagating the two way IR signals through an IR link, in line of sight, instead of the fiber optic cables or light guides, the link between the IR components or the line of sight become important item that need to be addressed. The disclosed IR drivers in the pending US applications teach a simple adjustable structure, a similar structure for perfecting the IR link by adjusting the direction of the line of sight of the photo diode or photo transistor 12 and the LED 13 is implemented with the present invention. It is preferable of course to provide a similar adjustable structure to the AC current sensor assemblies 4MIR (not shown) and 4SMIR shown in FIG. 7C and to the dimmer assembly 6MIR as shown in FIGS. 7A~7B.

Figures 7A, 7B, 7C, 7D, 7E, 7F, 7G:
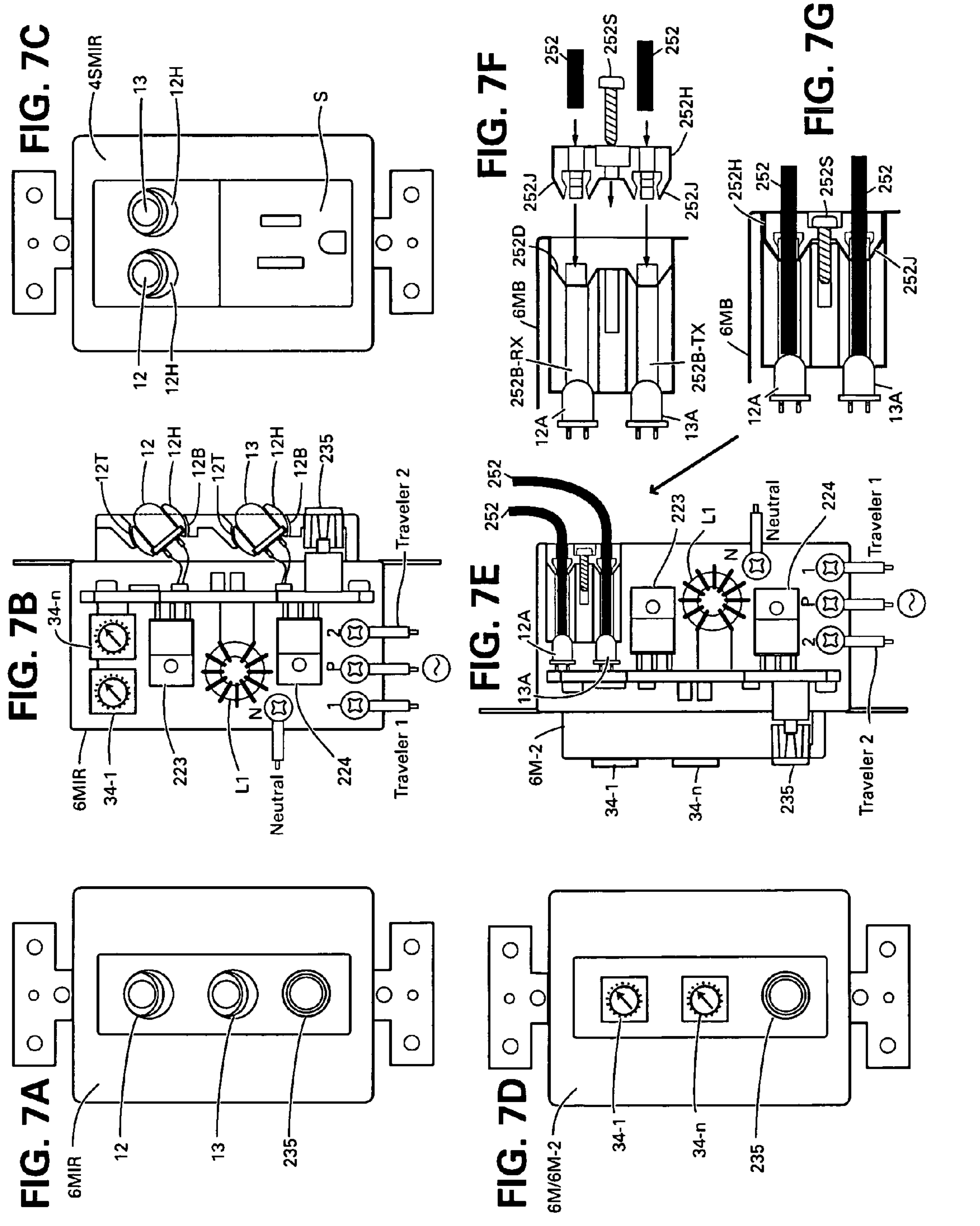
FIGS. 7A~7G are illustration of the triac assemblies of FIGS. 1~2 and of the current sensor of FIG. 6F including the structure of the adjustable two way IR TX and RX heads and the dual light guides or fiber optic cables install and locking structure of the preferred embodiment of the present invention.

The IR LED 13 and the photo diode or photo transistor 12 shown in FIGS. 7A~7C are encapsulated in a truncated ball shape holder 12H that is supported by a round or circled cutout, comprising the bottom side 12B and top side 12T of FIG. 7B. The shown cutouts are structured to provide for upward and side way adjustments of the LED 13 and the photo diode 12 toward the ceiling IR driver 70 and/or the wall IR driver 90 shown in FIG. 10 and disclosed in the pending US applications, but the cutouts can be made for adjustment downward as the need arises. The cutouts are sized to provide tight gripping of the truncated ball or other rounded shape holder 12H, such that the IR LED 13 or photo diode 12 will require finger force to overcome the grip and not to be loose. An adjustment by human finger pressure with no special tool enables the user to readjust the "in line of sight" at any time as the need arises.

The structure shown in FIGS. 7A~7C or any other structure for providing simple adjustment, including adjustment by a tool such as screw driver (not shown), is clearly advantageous, because AC switches, dimmers, AC sockets and outlet assemblies that are mounted on wall are obstructed regularly or at random by appliances, furnitures and the like. It is therefore preferable that their LED and/or the photo transistor are easily adjusted for directing the IR signals into a line of sight.

FIGS. 7D and 7E show a structure of the dimmer assemblies 6M/6M-2 of FIGS. 2 and 3, using the light guide or fiber optic cable 252 for communicating commands, statuses and data. FIG. 7D shows the front of the dimmer 6M/6M-2 including the setting switches 34-1 and 34-n for setting a zone or a room address and/or appliance address and the select key 235. FIG. 7E also shows the inner structure to include the dual triacs 223 and 224, the chock coil L1, the select key 235 and the setting switches 34-1/34-n, which are explained and discussed above.

FIG. 7E shows the two light guides or fiber optic cable 252 installed into the dimmer 6M-2. Even though a prism is not shown in FIG. 7E, it is obvious that the prism 255 shown in FIG. 6E, 8E or 8B can be included in any of the dimmers or the current sensors for connecting to and communicating with the dimmer or the current sensor via a single light guide or fiber optic cable 252, such as shown in the dimmer 6M of FIG. 3.

The dimmers 6MIR of FIGS. 7B and 6M-2 of FIG. 7E are shown with a neutral AC terminal N. As explained above the preferred embodiment of the dimmers of the present invention can be connected between the AC live line and the two travelers 1 and 2 only, or they can be connected also to the neutral line when such line is extended into the electrical box intended for the dimmer. Such neutral wire enables a simpler rectifier circuit inside the dimmer, and provides for full on (100%) switching. Otherwise the structure and the applications of all the dimmers shown in FIGS. 1~3 and in 7A, 7B, 7D and 7E are same, and can be operated via IR commands in line of sight, via single/dual light guides or fiber optic cables 252.

The advantages offered by connecting a single cable 252 versus two cables 252 to the dimmers (for dimming light fixtures and for switching on-off different electrical appliances), as well as for connecting the current sensors of the present invention, including current sensors integrated with an AC socket or outlet S such as shown in FIG. 7C, are many. The most obvious advantage is the cost, providing and installing single light guide or fiber optic cable 252 versus two, offer literal half cost in materials and substantial additional savings in installation costs.

The installation of a single cable 252 is a simple process explained below, while the installation of two cables 252 require the identification of the receive line and the transmit line. Of course it is possible to have the jackets of the light guide or the fiber optic cables 252 in different colors or markings, but as each of the cables is connected at one end to a transmitter (LED) 13A and in the other end to a receiver (photo diode) 12A, the installer or the electrician that connects the two light guides or fiber optic cables 252, such as shown in FIG. 7E, has to be aware and identify the receiving line and the transmitting line before actually connecting them.

The preferred embodiment of the present invention includes a cable identification program embedded into the system controller, including the referred to above video interphone monitor or shopping terminal, such that all the transmitting LEDs 13A will switch on, thereby providing the installer or the electrician the ability to visually see and identify the propagated light through the light guide 252 (visual light such as red or yellow or green) and/or detect an IR radiation via an IR detector. Once a light guide or fiber optic cable 252 is identified as propagating a light or IR, it is clear that the other end of the cable should be installed into the receiving socket 252B-RX of the body 6MB shown in FIG. 7F. At the same time it is preferable that the LED 13A of FIG. 7F is switched on to indicate a transmitter socket and thereby identify clearly that the other socket is the receiver for connecting the 252 cable that carry light or IR signal. By such simple example, it become very clear that two light guides or fiber optic cables can be efficiently identified and installed into their respective sockets 252B-RX and 252B-TX. FIG. 7F also illustrating a cable holder or an optical plug 252H, having jaws 252J to vise and secure the cables 252 into place when they are inserted via the holder 252H into the respective sockets 252B-RX and 252B-TX.

Figures 9A, 9B, 9C:
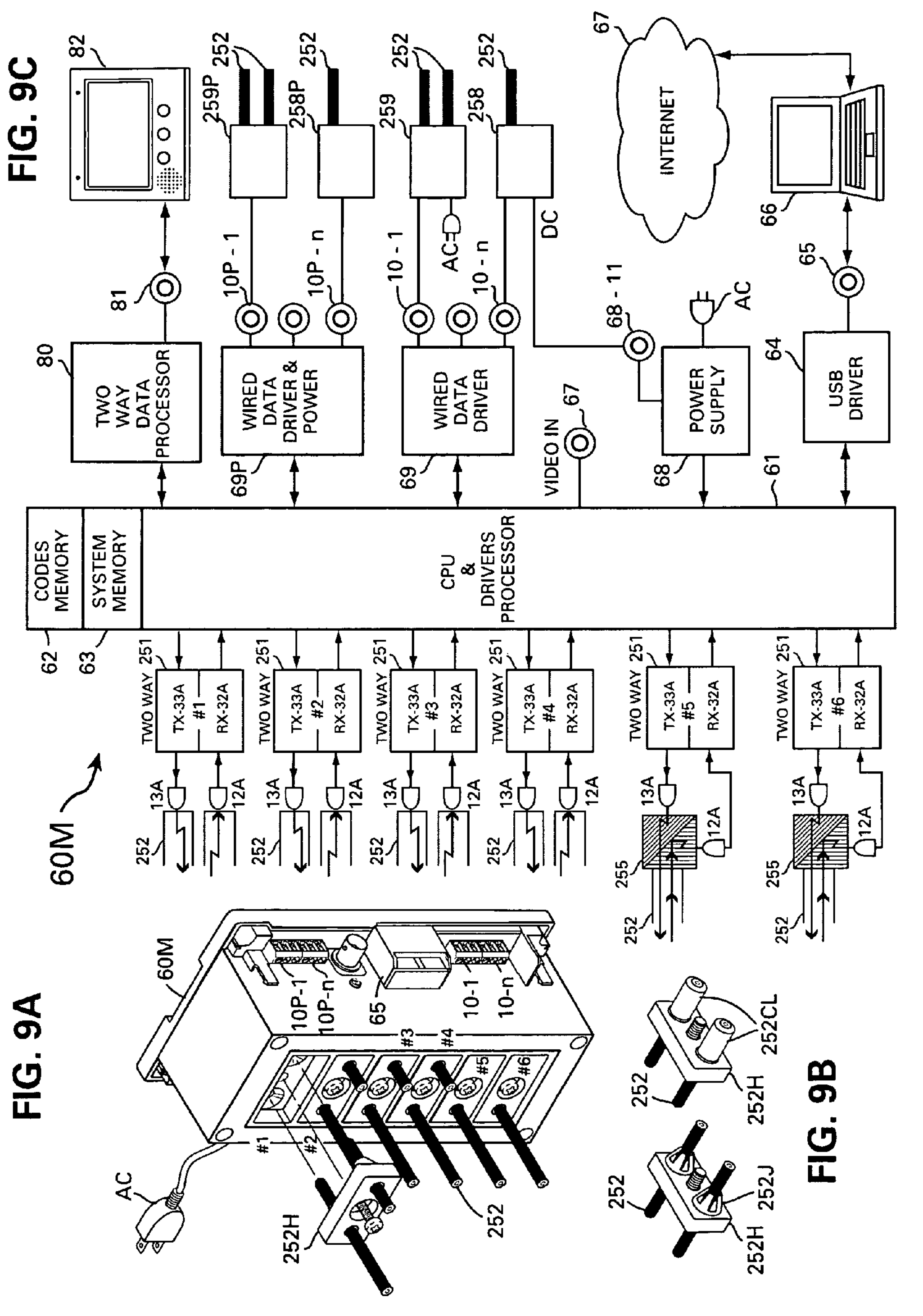
FIGS. 9A~9C are illustration and block diagram of the communication distributor and power supply, including the light guide or fiber optic cable circuits, connections and support.

The jaws shown in FIG. 7G, with the cables 252 installed, are pressured against the tapered portions 252D for forcing the jaws tightly against the cables 252, thereby locking or vising the cables into position as the screw 252S is tightened and supporting the cable holder 252H to the body 6MB of a device, such as a dimmer, current sensor, current sensor with AC socket or protocol converter. Similar cable holders 252H for a single or dual cable are also shown in FIGS. 9A, 9B and 10. Alternatively the holder 252H can be provided with one or two collars 252CL shown in FIG. 9B for bonding or crimping the cables. Such holder 252H is in fact an optical guide plug, this is because fiber optic or light guide plugs are based on a cable collar that is bonded or crimped around the cable. For this reason the term holder in the following description includes fiber optic or light guide plugs. The light guide and the fiber optic cable can be terminated or shaped at its one or both ends, such that the cable ends fit into the sockets 252B-RX or 252B-TX or into the holder or plug 252H.

Figures 8A, 8B, 8C, 8D, 8E, 8F:
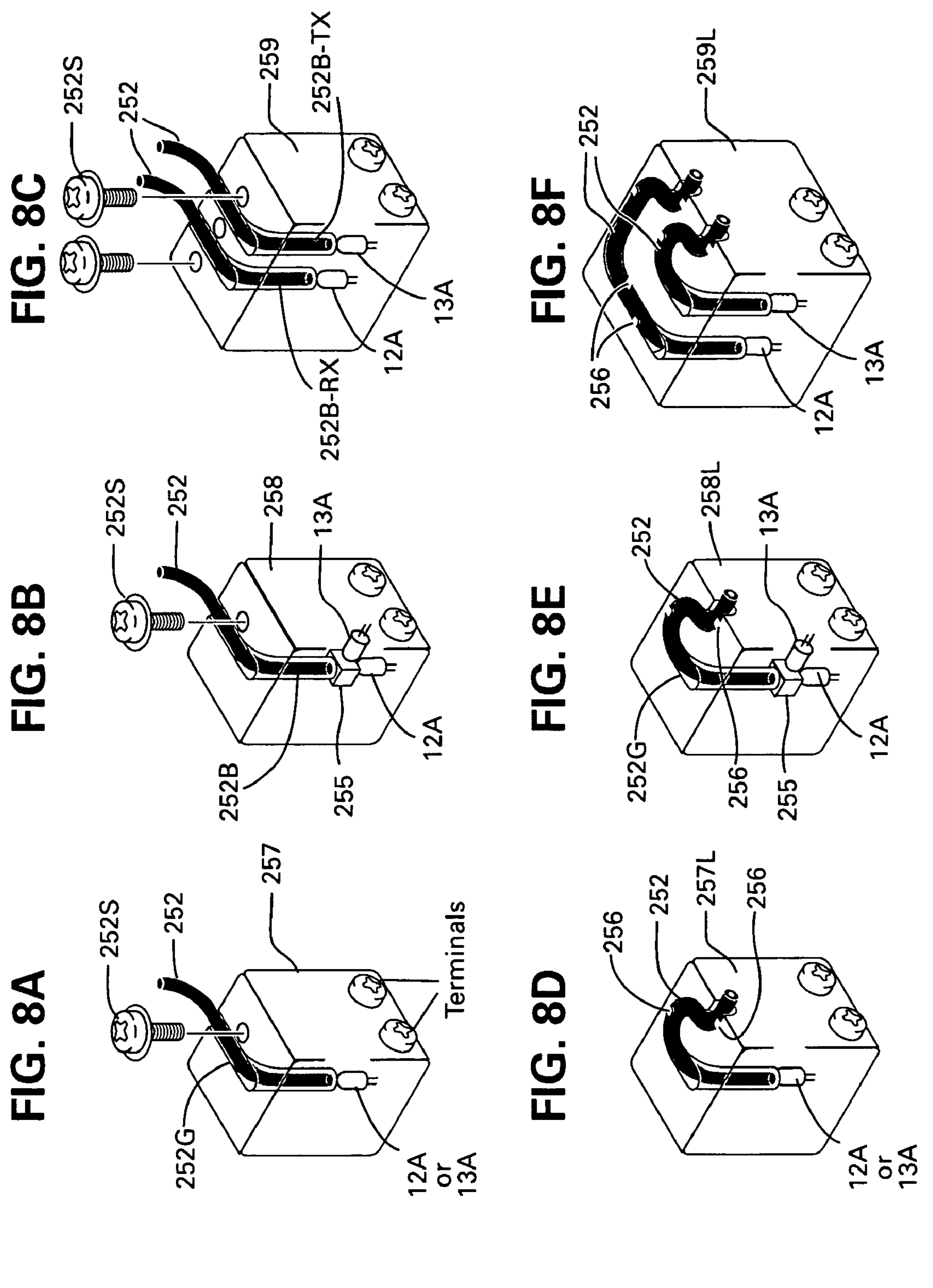
FIGS. 8A~8F are illustrations showing the command converters and further examples of the install and the locking of a single or dual light guides or fiber optic cables of the preferred embodiments.

FIGS. 8B and 8E show the protocol converters 258 of FIG. 3 and FIGS. 8C and 8F show the protocol converters 259 of FIG. 2. The difference between the converter 258 and 258L of FIGS. 8B and 8E is in the install of the cable 252 and its locking/securing arrangement. Same applies to the protocol converters 259 and 259L of FIGS. 8C and 8F. The converters shown in FIGS. 8A~8F as a box can be constructed in a case similar to the relay 6 structure of FIG. 4B or to the dimmer structure 6M or 6M-2 shown in FIG. 5A, 5B or 7D or they can be encapsulated in any other convenient shapes for installation into electrical boxes or electrical cabinets. For example, the command converters may be constructed for incorporation into the IR wall or ceiling drivers, utilizing a single CPU 30 for operating multiple TX/RX drivers/receivers, or inside the home automation controller including the video interphone monitor or the shopping terminal.

The converters may include the setting switches 34-1~34-n for setting the room, zone and/or appliance address, or they may be non intelligent devices such as receiving electrical signals via the wired network 10 or 10P and converting them into light signals via the light guide or fiber optic cables 252 and/or receiving light signals via the light guide or fiber optic cable 252 and converting them into electrical signal via the wired network 10 or 10P. Outside the TX/RX driver/receiver 33A and 32A the circuits of the converters can comprise, for example, the CPU 30, the memory 30A and the AC rectifier circuit shown in FIG. 6D and explained above, or it can use the wired network 10P for feeding control commands and statuses as detailed in the pending US applications.

The converters may use a separate low voltage DC power supply for powering the converters of a system and communicate via a wired network 10 with the distributor and power supply 60M shown in FIGS. 9A and 9C. It should become obvious that any of the powering discussed, via AC rectifier circuit, or via a separate power supply, such as the power supply 68 shown in FIG. 9C, or via the powering through the wired network 10P disclosed in the pending US applications can be used. Similarly it is possible to connect the command converters with two light guides or fiber optic cables 252 or include the prism 255 and connect them with a single light guide cable. It is also clear that the converters can include the CPU 30 and the memory 30A along with the setting switches 34-1~34-n for setting the addresses and provide identity and intelligence to the converter, or the converter can be programmed to be a non intelligent converter for converting any and all received electrical signals into light signals and vice versa, light signals into electrical signals.

The command converters 257 and 257L shown in FIGS. 8A and 8D are one way converters, for either receiving electrical signal and generating light signal or for receiving light signals and transmitting electrical signal into the network 10 or 10P. Such one way converters are used with appliances that are operated via manual switch or via a dedicated automatic controller (not part of the home automation), such as operating water boiler via an automatic timers and using the current sensor to update the system with current on or off status.

The current sensor for such application can be programmed to generate current status data whenever a change in the AC current is detected at random, caused either by a mechanical switch or by auto timer switch, as explained above. Of course such a single, one way command converters will have only TX circuit 33A and LED 13A for operating appliances, or only the RX circuit 32A and the photo diode or photo transistor 12A for receiving status or data from an appliance, and they are connected to their wired network through the shown terminals in FIG. 8A. The one way command converters 257 can be powered via the many power supply options, similar to the power options explained for the other command converters 258 and 259 above.

Shown in FIG. 8A~8F are the many different attachments and support for the light guides and fiber optic cables 252 the present invention offer. These include the cables 252 insertion into the cable holder 252H and into the cable sockets 252B-RX and 252B-TX shown in FIG. 7F and the simple cable insertions and locking/securing shown in FIGS. 8A~8D, using a single or dual screws 252S, or the molded tabs 256. FIGS. 8A~8D illustrate clearly the simplicity of the installation/connections of the preferred embodiment of the present invention. The light guides or fiber optic cables are simply cut, inserted into the dual sockets 252B-RX and 252B-TX or the single socket 252B, bended into the groove 252G and held/secured into place by the single or dual screws 252S, or by the molded tabs 256 of the single or dual grooves 252G.

There are endless possibilities for providing molded holders with endless shapes of self locking hooks. Further, the socket 252B-TX and RX can be part of the grooves 252G, in which case the LED 13A, the photo diode or photo transistor 12A and/or the prism 255 will be positioned at the end of the grooves. Instead of the two screws 252S shown in FIG. 8C a single screw, between the two grooves 252G can be used. It is obvious that there are endless variations and possibilities for connecting, inserting, holding and securing the light guide or the fiber optic cables 252 into place. The simplicity of which is clearly demonstrated by the illustrations of the preferred embodiments of the present invention.

Shown in FIGS. 9A and 9C is the home automation system distributor and power supply 60M. A similar distributor and power supply is also disclosed in the pending US applications. The difference between the present invention and the pending US applications are the light guides or fiber optic cables 252 connections and the changes from the IR RX receiver 32 with the photo diode 12 and the IR TX driver 33 with the IR LED 13 disclosed in the pending US application versus the RX 32A with the photo diode or photo transistor 12A and the TX 33A with the LED 13A of the present invention. The system distributor 60M block diagram of FIG. 9C shows the two way communications between the video interphone monitor 82 via two way data processor 80, which processes audio, video, alarm, home automation and data two way for enabling, among others, to communicate between a PC 66 via the USB driver 64 and through the Internet 67 with the home owner at, for example, his office or from other places.

Outside the audio, video, alarm and data that is fed to the home owner through its video interphone system, he can also review the status of the home automation and the electrical appliances. The owner can further command and operate or switch off any or all of the appliances at will. The distributor and power supply 60M further provide for connecting video camera or the output of a CCTV video system selector into the input 67, thereby providing the owner of the house a video review of the house interior and/or exterior, particularly during alarm.

The shown wired data driver 69 and the wired data driver and power 69P are fully explained in the pending US application and are shown here for illustrating how to connect the protocol converters 259, 258, 259P and 258P into the system. The command converter 259P is fed with communication and power via terminal 10P, while the protocol converters 258 are shown powered individually via the DC power terminal 68-11 of the power supply 68.

The block diagram of FIG. 9C shows six transceivers 251 or RX-TX circuits 12A, 32A, 13A and 33A for feeding commands and receiving statuses and data via light guides or fiber optic cables 252. Four circuits (#1~#4) are shown for connecting with dual light guides 252, while two (#5 and #6) are shown to include prism 255 for connecting with a single light guide or fiber optic cable 252. The illustration of the system distributor and power supply 60M of FIG. 9A shows similar arrangement wherein the #1~#4 connections are used for two light guides 252 while #5 and #6 are used for a single light guide 252, but any combinations can be applied, including such as for example, for a single light guide cable 252 connection only.

FIG. 10 shows the system connections via twisted pairs 10P, 10, the single and dual light guides of fiber optic cables 252 and IR communication in line of sight. The system distributor 60M is connected in cascade to the ceiling IR driver 70 and a wall IR driver 90 for receiving IR statuses and data via the adjustable photo diodes or photo transistors 12 and for propagating IR commands via the adjustable IR LEDs 13. The IR drivers 70 and 90 are disclosed in the pending US applications. The keypad 40 is also shown connected via a twisted pair 10P, carrying two way communications and power feed to the keypad 40, similar to the power feed to the IR driver 70 and 90. The keypad 40 for remotely controlling appliances is also disclosed in the pending US applications, including IR keypads for communicating in line of sight with relays, current sensors and AC outlets.

The shown current sensor with AC outlet 4SMIR is not connected via a twisted pair nor via light guide, it is controlled and operated via the two way IR signals, adjustable to in line of sight, between the current sensor 4SMIR and the IR drivers 70 or 90. Same applies to the dimmer 6MIR that includes adjustable LED and photo diode or transistor for communicating in line of sight with the IR drivers 70 or 90.

The command converter 259P is shown connected via the twisted pair 10P for communicating two ways and feeding the power for operating the command converter. The command converter 259P can be installed in a given electrical box with no AC power wire connections and be connected as shown in FIG. 10 to a dimmer 6M-2 installed in another electrical box via dual light guides or fiber optic cables 252, thereby providing two way communications between the dimmer 6M-2 and the system distributor and power supply 60M.

The command converter 258 of FIG. 10 is shown to be connected to the system distributor and power supply 60M via a communication line 10 (twisted pair), while its operating DC power is fed separately from the terminal 68-11. The command converter 258 is connected to a dimmer 6M via a single light guide or fiber optic cable 252. In this arrangement, similar to the 259P command converter explained above, the command converter 258 is mounted into an electrical box, having no AC power connections and the connection between the box of the command converter 258 and the box of the dimmer 6M is via a single light guide or fiber optic cable that offers high insulation level and is fire retardant, posing no electrical or fire hazard.

Also shown in FIG. 10 is a command converter 258IR for communicating two way with the IR drivers 70 or 90 and completing the two way communication with the dimmer 6M via a single light guide or fiber optic cable 252. The command converter 258IR includes the circuits shown in FIG. 6D with the exception of the current sensor 31T and the terminal 8B. FIG. 6D shows two circuits 33A and 32A, one for communicating via dual light guides 252 and the other for communicating two way via the prism 255 and a single light guide 252. The shown command converter 258IR of FIG. 10 includes only the circuits with the prism 255 for communicating via single light guide or fiber optic cable 252. Another command converter for example 258IR-2 (not shown) can be constructed without the prism 255 and be used with dual light guides or fiber optic cables 252.

Figure 11:
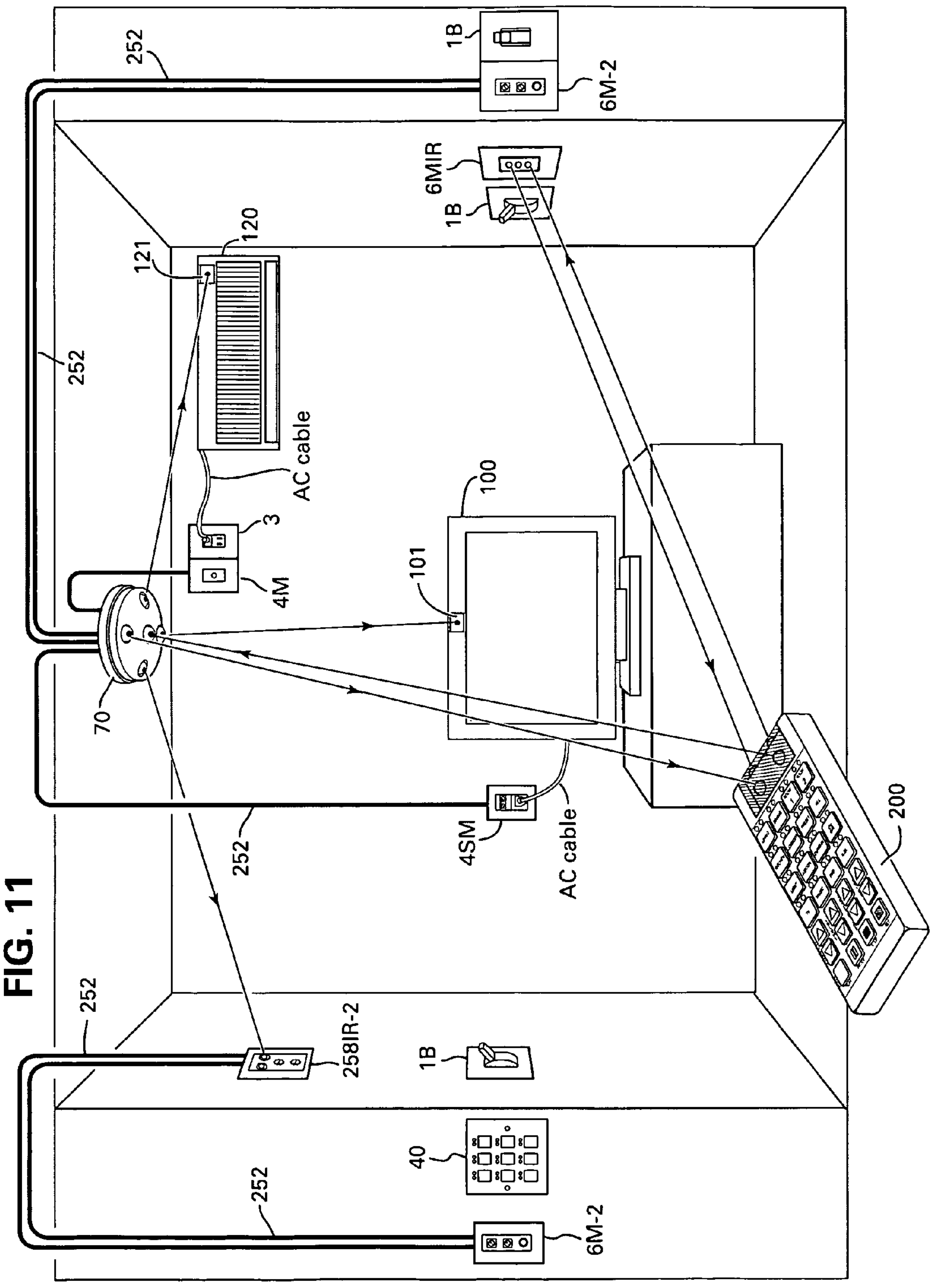
FIG. 11 is an illustration showing the setup and operation of the home automation of the present invention.

The IR RX and TX circuits 32 and 33, the LED 13 and the photo diode 12 are included in both versions of the command converters 258IR and 258IR-2 that is shown in FIG. 11, with the LED and the photo diode are installed into a ball shaped holder and made adjustable for adjusting the line of sight as explained above. This enables to operate the dimmer 6M of FIG. 10 that is connected to the command converter 258IR via the single light guide cable 252 or to 6M-2 of FIG. 11 that is connected via dual guide cables 252. The advantage for this arrangement is the ability to install IR communication in line of sight in those instances in which the dimmer is installed in corridors and areas that are obstructed and cannot be adjusted to line of sight with the drivers 70 or 90. In such an example the command converter 258IR or 258IR-2 become a relay station between the IR driver 70 or 90 and the dimmer 6M or 6M-2.

The addresses setting switches 34-1 and 34-n shown in FIG. 6D can be incorporated into the command converter 258IR or 258IR-2, giving the converter an addresses and intelligence in its processing capabilities, or they can be eliminated and the converter will simply forward two way the communications between the drivers 70 or 90 and the dimmer 6M as is.

FIG. 11 illustrates the functionality of the devices of the present invention, all of which can be operated via remote control device 200 directly or via the IR driver 70 disclosed in the pending US application, along with commands and confirmations data propagated via the light guides or fiber optic cables 252. The shown IR ceiling driver provides for IR communications in line of sight, such as commanding the television 100 through its IR receiver 101 or the air conditioner 120 via its IR receiver 121. The television is powered via the current sensor with AC outlet 4SM for feeding current on-off status via the light guide 252 to the ceiling driver 70 and from there to the main controller or the video interphone (not shown). The air conditioner is powered via AC socket 3, however its AC live line passes through the current sensor 4M, again for feeding returned status on or off via the light guide 252.

The mechanical SPDT light switch 1B is shown side by side with the dimmer 6MIR that is directly operated by the IR remote control 200, requiring no further interconnection via light guides or fiber optic cables 252. Another switch 1B is connected to a dimmer 6M-2, which receives commands from and transmit statuses to the IR ceiling driver 70.

It becomes clear that the interconnections in combinations with low voltage control lines 10P and 10 with or without carrying DC power, light guide of fiber optic cables and IR in line of sight, can all be harmonized for implementing low cost, highly efficient home automation including the many appliances used in homes, offices or business. Similarly the shown command converter 258IR-2 connected to the dimmer 6M-2 with both devices powered by the AC line. The setup fully comply with the electric code requirements and the devices 258IR-2 and 6M-2 can be mounted into electrical boxes and interconnected by the light guides 252 that are electrically safe. The light guides or fiber optic cables fully comply with the fire codes for such installations, offer a low cost solution to otherwise complex, expensive, and restricted by the electrical and fire hazard codes, rules and regulation. This harmonized interconnection and the two way commands in line of sight or via light guides can solve the complexity that have seriously held back the home automation penetrations, including multi apartment buildings.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for connecting an AC current detecting device with an automation controller network device via an optical grid of an optical cable for propagating one way optical signals, said network device comprising a CPU, a communication circuit and a first optical receiver, said AC current detecting device comprising a CPU, a communication circuit, a current sensing circuit and a second optical transmitter for detecting an AC current drain by a load and said load status;

an optical element of each optical receiver and each optical transmitter is enclosed in an opaque socket with an optical access and a holder commensurate with a size and a shape of a terminated end of said optical cable, said method comprising the steps of:

a. terminating one said optical cable at its both ends by a process selected from a group comprising cutting, shaping, polishing, lapping, fitting a plug and combinations thereof for providing a processed surface at both ends of the optical cable;

b. attaching and securing the two processed surfaces of each said terminated end one to each said optical element directly via each said opaque socket by each said holder;

c. introducing to at least one of said CPU an identification pertaining to at least one of said load and said AC current detecting device;

d. connecting said load to an AC power through said AC current detecting device;

e. operating said load;

f. detecting by said current sensing circuit the current drained by said load and said load status; and g. propagating said one way optical signal including said identification and reporting at least one of the load current drain and the load status via said grid.

2. The method for connecting an AC current detecting device according to claim 1, wherein said automation controller is selected from a group comprising a dedicated controller, a video interphone, a shopping terminal and a combination thereof, said network device is selected from a group comprising an home automation control distributor, an optical driver, an optical repeater, a command converter, a current drain data receiver, a keypad and combinations thereof, said optical cable is selected from a group comprising a fiber optic, a lightguide and a combination thereof and said holder is selected from a group comprising a crimp plug, a bond plug, a self-lock plug, a vise plug, a screw, a structured indentation, a bar, a clamp, a clamp ring, a jaw and combinations thereof.

3. The method for connecting an AC current detecting device according to claim 1, wherein said introducing of an identification includes at least one of a location and particulars of said load.

4. The method for connecting an AC current detecting device according to claim 1, wherein said AC current detecting device is selected from a group comprising an AC current sensor, an AC outlet, an AC switch, an AC relay and combinations thereof.

5. The method for connecting an AC current detecting device according to claim 4, wherein each of said relay and said switch further comprising an operating key for switching said load on and off.

6. The method for connecting an AC current detecting device according to claim 4, wherein one of said relay and said switch is one of a semiconductor and electromechanical device.

7. The method for connecting an AC current detecting device according to claim 6, wherein said AC current detecting device further comprising a second optical receiver and said network device further comprising a first optical transmitter for propagating two way optical signals, said method comprising the further steps of:

h. terminating a second said optical cable by said process;

i. attaching and securing the two processed surfaces of said terminated ends of said second optical cable to each said optical element directly via each said opaque socket by each said holder of said first optical transmitter and said second optical receiver respectively; and j. exchanging said two way optical signal by augmenting said reporting to include commands inquiring said load current drain and said load status from said network device to said AC current detecting device.

8. The method for connecting an AC current detecting device according to claim 7, wherein said commands are augmented to include commands for controlling said load and the power consumed by said load.

9. The method for connecting an AC current detecting device according to claim 6, wherein each said network device further including a first transceiver comprising a first plastic molded structure, a first transmit optical element and a first receive optical element, said AC current detecting device further including a second optical transceiver comprising a second plastic molded structure, a second receive optical element and a second transmit optical element, wherein each said plastic molded structure includes a combined optical access for accessing the two optical elements of each said transceiver for propagating two way optical signals;

each said combined optical access is enclosed in said opaque socket and wherein each said optical element in step b. of said method are replaced by said two optical elements of each said transceiver for said propagating two way optical signals via a single said optical cable; and augmenting said reporting in step g. to include commands inquiring said load current drain and said load status from said network device to said AC current detecting device.

10. The method for connecting an AC current detecting device according to claim 9, wherein said commands are augmented to include commands for controlling said load and the power consumed by said load.

11. A method for connecting an AC current detecting device including one of an SPDT and DPDT relay with an automation controller network device via an optical grid of an optical cable for operating a load via at least one of SPDT and DPDT switch by the connection of two traveler wires extended between two traveler terminals of said relay and two traveler terminals of said switch, said AC current detecting device comprising a CPU, a communication circuit, a current sensing circuit, a second optical receiver and a second optical transmitter, each said network device comprising a CPU, a communication circuit, a first optical transmitter and a first optical receiver for propagating two way optical signals;

an optical element of each optical receiver and each optical transmitter is enclosed in an opaque socket with an optical access and a holder commensurate with a size and a shape of a terminated end of said optical cable, said method comprising the steps of:

a. terminating two said optical cables at their both ends by a process selected from a group comprising cutting, shaping, polishing, lapping, fitting a plug and combinations thereof for providing a processed surface of each end of said optical cables;

b. attaching and securing each of said processed surface of each terminated end of a first said optical cable to each said optical elements directly via said opaque socket of said first optical transmitter and said opaque socket of said second optical receiver by each said holder respectively;

c. attaching and securing each of said processed surface of each terminated end of a second said optical cable to each said optical element directly via said opaque socket of said second optical transmitter and said opaque socket of said first optical receiver by each said holder respectively;

d. connecting said two traveler wires;

e. connecting said AC current detecting device including a pole of said relay to said AC power and said load to a pole terminal of said switch;

f. introducing to at least one of said CPU an identification pertaining to at least one of said load and said AC current detecting device;

g. exchanging said two way optical signals selected from a group comprising control commands, confirmations, statuses, current drain, data and combinations thereof for at least one of operating and controlling said load including at least one of monitoring said load current drain and said load status.

12. The method for connecting an AC current detecting device according to claim 11, wherein said automation controller is selected from a group comprising, a dedicated controller, a video interphone, a shopping terminal and a combination thereof, said network device is selected from a group comprising an home automation control distributor, an optical driver, an optical repeater, a command converter, a current drain data receiver, a keypad and combinations thereof, said optical cable is selected from a group comprising a fiber optic, a lightguide and a combination thereof and said holder is selected from a group comprising a crimp plug, a bond plug, a self-lock plug, a vise plug, a screw, a structured indentation, a bar, a clamp, a clamp ring, a jaw and combinations thereof.

13. The method for connecting an AC current detecting device according to claim 11, wherein said introducing of an identification includes at least one of a location and particulars of said load.

14. The method for connecting an AC current detecting device according to claim 11, wherein said AC current detecting device further include an operating key for switching said load on and off.

15. The method for connecting an AC current detecting device according to claim 11, wherein said relay is a semiconductor relay.

16. The method for connecting an AC current detecting device according to claim 15, wherein said commands further include commands for controlling the power consumed by said load.

17. A method for connecting AC current detecting device including one of an SPDT and DPDT relay with an automation controller network device via an optical grid of an optical cable for operating a load via at least one of an SPDT and DPDT switch by the connection of two traveler wires extended between two traveler terminals of said relay and two traveler terminals of said switch, said AC current detecting device comprising a CPU, a communication circuit, a current sensing circuit and a second optical transceiver, said network device comprising a CPU, a communication circuit and a first optical transceiver for propagating two way optical signal;

said first transceiver comprising a first plastic molded structure, a first transmit optical element and a first receive optical element, said second optical transceiver comprising a second plastic molded structure, a second receive optical element and a second transmit optical element, each said plastic molded structure includes a combined optical access for accessing the two optical elements of each optical transceiver, said two optical elements and said combined optical access are enclosed in an opaque socket including a holder, said method comprising the steps of:

a. terminating said optical cable at its both ends by a process selected from a group comprising cutting, shaping, polishing, lapping, fitting a plug and combinations thereof for providing a processed surface at both ends of the optical cables;

b. attaching and securing each of said processed surface of a terminated end of said optical cable to each said two optical elements directly of each said transceiver via each said opaque socket by each said holder respectively;

c. connecting said two traveler wires;

d. connecting said AC current detecting device including a pole of said relay to said AC power and said load to a pole terminal of said switch;

e. introducing to at least one of said CPU an identification pertaining to at least one of said load and said AC current detecting device; and f. exchanging said two way optical signals selected from a group comprising control commands, confirmations, statuses, current drain, data and combinations thereof for at least one of operating and controlling said load including at least one of monitoring said load current drain and said load status.

18. The method for connecting an AC current detecting device according to claim 17, wherein said automation controller is selected from a group comprising, a dedicated controller, a video interphone, a shopping terminal and a combination thereof, said network device is selected from a group comprising an home automation control distributor, an optical driver, an optical repeater, a command converter, a current drain data receiver, a keypad and combinations thereof, said optical cable is selected from a group comprising a fiber optic, a lightguide and a combination thereof and said holder is selected from a group comprising a crimp plug, a bond plug, a self-lock plug, a vise plug, a screw, a structured indentation, a bar, a clamp, a clamp ring, a jaw and combinations thereof.

19. The method for connecting an AC current detecting device according to claim 17, wherein said introducing of an identification includes at least one of a location and particulars of said load.

20. The method for connecting an AC current detecting device according to claim 17, wherein said AC current detecting device further comprising an operating key for switching said load on and off.

21. The method for connecting an AC current detecting device according to claim 17, wherein said relay is a semiconductor relay.

22. The method for connecting an AC current detecting device according to claim 21, wherein said commands further include commands for controlling the power consumed by said load.

23. The method for connecting an AC detecting device according to claim 1, wherein said AC detecting device is structured to fit an electrical box and designed for installation selected from a group comprising front surface mounting side by side with electrical wiring device in an adjacent electrical box, side by side mounting with electrical wiring device inside an electrical box accessible from the front surface, front surface mounting with no adjacent electrical wiring devices, inside an electrical box mounting at the rear of an electrical wiring device occupying the front surface and hidden mounting inside an electrical box with blank cover.

24. The method for connecting an AC detecting device according to claim 11, wherein said AC detecting device is structured to fit an electrical box and designed for installation selected from a group comprising front surface mounting side by side with electrical wiring device in an adjacent electrical box, side by side mounting with electrical wiring device inside an electrical box accessible from the front surface, front surface mounting with no adjacent electrical wiring devices, inside an electrical box mounting at the rear of an electrical wiring device occupying the front surface and hidden mounting inside an electrical box with blank cover.

25. The method for connecting an AC detecting device according to claim 17, wherein said AC detecting device is structured to fit an electrical box and designed for installation selected from a group comprising front surface mounting side by side with electrical wiring device in an adjacent electrical box, side by side mounting with electrical wiring device inside an electrical box accessible from the front surface, front surface mounting with no adjacent electrical wiring devices, inside an electrical box mounting at the rear of an electrical wiring device occupying the front surface and hidden mounting inside an electrical box with blank cover.

26. An AC current detecting device for connection to an automation controller network device via an optical grid of an optical cable, said network device comprising a CPU, a communication circuit and a first optical receiver, said AC current detecting device comprising a CPU, a communication circuit, a current sensing circuit and a second optical transmitter, at least one of said CPU includes at least one of a memory and a setting selector for introducing an identification pertaining to at least one of a load and said AC current detecting device;

an optical element of each optical receiver and each optical transmitter is enclosed in an opaque socket with an optical access and a holder commensurate with a size and a shape of a terminated end of said optical cable, terminated at its both ends by a process selected from a group comprising cutting, shaping, polishing, lapping, fitting a plug and combinations thereof, each said holder attach and secure one processed surface of the two terminated ends of said optical cable to each said optical element directly via each said opaque socket;

said current sensing circuit detects a current drained by said load connected to an AC power through said AC current detecting device and said second optical transmitter propagates one way optical signal including said identification for reporting at least one of the load current drain and the load status to said first optical receiver.

27. The AC current detecting device according to claim 26, wherein said automation controller is selected from a group comprising, a dedicated controller, a video interphone, a shopping terminal and a combination thereof, said network device is selected from a group comprising an home automation control distributor, an optical driver, an optical repeater, a command converter, a current drain data receiver, a keypad and combinations thereof, said optical cable is selected from a group comprising a fiber optic, a lightguide and a combination thereof and said holder is selected from a group comprising a crimp plug, a bond plug, a self-lock plug, a vise plug, a screw, a structured indentation, a bar, a clamp, a clamp ring, a jaw and combinations thereof.

28. The AC current detecting device according to claim 26, wherein said introducing of an identification includes at least one of a location and particulars of said load.

29. The AC current detecting device according to claim 26, wherein said AC current detecting device is selected from a group comprising an AC current sensor, an AC outlet, an AC switch, an AC relay and combinations thereof.

30. The AC current detecting device according to claim 29, wherein each of said relay and said switch further comprising an operating key for switching said load on and off.

31. The AC current detecting device according to claim 29, wherein at least one of said relay and said switch is one of a semiconductor and electromechanical device.

32. The AC current detecting device according to claim 31, wherein said AC current detecting device further comprising a second optical receiver and said network device further comprising a first optical transmitter for propagating two way optical signals by attaching and securing two processed surfaces of a second optical cable to each said optical element via each said opaque socket by each said holder of said first optical transmitter and said second optical receiver respectively and by augmenting said reporting to include commands inquiring said load current drain and said load status.

33. The AC current detecting device according to claim 32, wherein said commands are augmented to include commands for controlling said load and the power consumed by said load.

34. The AC current detecting device according to claim 29, wherein said network device further comprising a first transceiver comprising a first plastic molded structure, a first transmit optical element and said first receive optical element, said AC current detecting device further comprising a second optical transceiver comprising a second plastic molded structure, a second receive optical element and said second transmit optical element, each said plastic molded structure includes a combined optical access for accessing the two optical elements of each said transceiver for propagating two way optical signals;

each said combined optical access of each said plastic molded structure is enclosed in said opaque socket and said holder attach and secure one processed surface of the terminated end of said optical cable directly to said optical elements for exchanging two way optical signals via a single said optical cable for augmenting said reporting to include commands inquiring said load current drain and said load status.

35. The AC current detecting device according to claim 34, wherein said commands are augmented to include commands for controlling said load and the power consumed by said load.

36. An AC current detecting device including one of an SPDT and DPDT relay for connection to an automation controller network device via an optical grid of an optical cable for operating a load via at least one of SPDT and DPDT switch by the connection of a pole of said relay to live AC, a pole of said switch to said load and two traveler wires between two traveler terminals of said relay and two traveler terminals of said switch;

said AC current detecting device comprising a CPU, a communication circuit, a current sensing circuit, a second optical receiver and a second optical transmitter, each said network device comprising a CPU, a communication circuit, a first optical transmitter and a first optical receiver, at least one of said CPU including at least one of a memory and a setting selector for introducing identification pertaining to at least one of said load and said AC current detecting device;

an optical element of each optical receiver and each optical transmitter is enclosed in an opaque socket with an optical access and a holder commensurate with a size and a shape of a terminated end of said optical cable, terminated at its both ends by a process selected from a group comprising cutting, shaping, polishing, lapping, fitting a plug and combinations thereof, each said holder attach and secure one processed surface of one terminated end of one said optical cable directly to said element via one said access and said opaque socket;

two said optical cables terminated at their both ends are extended between said AC current detecting device and said network device, a first said optical cable is extended between said first optical transmitter and of said second optical receiver and a second said optical cable between said second optical transmitter and said first optical receiver for propagating two way optical signals selected from a group comprising control commands, confirmations, statuses, current drain, data and combinations thereof for at least one of operating and controlling said load including at least one of monitoring said load current drain and said status.

37. The AC current detecting device according to claim 36, wherein said automation controller is selected from a group comprising, a dedicated controller, a video interphone, a shopping terminal and a combination thereof, said network device is selected from a group comprising an home automation control distributor, an optical driver, an optical repeater, a command converter, a current drain data receiver, a keypad and combinations thereof, said optical cable is selected from a group comprising a fiber optic, a lightguide and a combination thereof and said holder is selected from a group comprising a crimp plug, a bond plug, a self-lock plug, a vise plug, a screw, a structured indentation, a bar, a clamp, a clamp ring, a jaw and combinations thereof.

38. The AC current detecting device according to claim 26, wherein said introducing of an identification includes at least one of a location and particulars of said load.

39. The AC current detecting device according to claim 26, wherein said AC current detecting device further include an operating key for switching said load on and off.

40. The AC current detecting device according to claim 26, wherein said relay is a semiconductor relay.

41. The AC current detecting device according to claim 40, wherein said commands further include commands for controlling the power consumed by said load.

42. An AC current detecting device including one of an SPDT and DPDT relay for connecting to an automation controller network device via an optical grid of an optical cable for operating a load via at least one of an SPDT and DPDT switch by the connection of a pole terminal of said relay to live AC, said load to a pole terminal of said switch and two traveler wires between two traveler terminals of said relay and two traveler terminals of said switch;

said AC current detecting device comprising a CPU, a communication circuit, a current sensing circuit and a second optical transceiver, said network device comprising a CPU, a communication circuit and a first optical transceiver, at least one of said CPU including at least one of a memory and a setting selector for introducing an identification pertaining to at least one of said load and said AC current detecting device;

said first transceiver comprising a first plastic molded structure, a first transmit optical element and a first receive optical element, said second optical transceiver comprising a second plastic molded structure, a second receive optical element and a second transmit optical element, each said plastic molded structure includes a combined optical access for accessing the two optical elements of each optical transceiver, said two optical elements and said combined optical access are enclosed in an opaque socket including a holder commensurate with a size and a shape of a terminated end of said optical cable terminated at its both ends by a process selected from a group comprising cutting, shaping, polishing, lapping, fitting a plug and combinations thereof;

the two terminated ends of said optical cable are extended between two said opaque sockets with each said holder attach and secure the processed surface of one terminated end of said optical cable to two said optical element of said first transceiver and said second transceiver for propagating two way optical signals;

said AC current detecting device and said network device exchange said two way optical signals selected from a group comprising control commands, confirmations, statuses, current drain, data and combinations thereof for at least one of operating and controlling said load including at least one of monitoring said load current drain and said status.

43. The AC current detecting device according to claim 42, wherein said automation controller is selected from a group comprising, a dedicated controller, a video interphone, a shopping terminal and a combination thereof, said network device is selected from a group comprising an home automation control distributor, an optical driver, an optical repeater, a command converter, a current drain data receiver, a keypad and combinations thereof, said optical cable is selected from a group comprising a fiber optic, a lightguide and a combination thereof and said holder is selected from a group comprising a crimp plug, a bond plug, a self-lock plug, a vise plug, a screw, a structured indentation, a bar, a clamp, a clamp ring, a jaw and combinations thereof.

44. The AC current detecting device according to claim 42, wherein said introducing of an identification includes at least one of a location and particulars of said load.

45. The AC current detecting device according to claim 42, wherein said AC current detecting device further comprising an operating key for switching said load on and off.

46. The AC current detecting device according to claim 42, wherein said relay is a semiconductor relay.

47. The AC current detecting device according to claim 46, wherein said commands further include commands for controlling the power consumed by said load.

48. The AC detecting device according to claim 26, wherein said AC detecting device is structured to fit an electrical box and designed for installation selected from a group comprising front surface mounting side by side with electrical wiring device in an adjacent electrical box, side by side mounting with electrical wiring device inside an electrical box accessible from the front surface, front surface mounting with no adjacent electrical wiring devices, inside an electrical box mounting at the rear of an electrical wiring device occupying the front surface and hidden mounting inside an electrical box with blank cover.

49. The AC detecting device according to claim 36, wherein said AC detecting device is structured to fit an electrical box and designed for installation selected from a group comprising front surface mounting side by side with electrical wiring device in an adjacent electrical box, side by side mounting with electrical wiring device inside an electrical box accessible from the front surface, front surface mounting with no adjacent electrical wiring devices, inside an electrical box mounting at the rear of an electrical wiring device occupying the front surface and hidden mounting inside an electrical box with blank cover.

50. The AC detecting device according to claim 42, wherein said AC detecting device is structured to fit an electrical box and designed for installation selected from a group comprising front surface mounting side by side with electrical wiring device in an adjacent electrical box, side by side mounting with electrical wiring device inside an electrical box accessible from the front surface, front surface mounting with no adjacent electrical wiring devices, inside an electrical box mounting at the rear of an electrical wiring device occupying the front surface and hidden mounting inside an electrical box with blank cover.

* * * * *